United States Patent [19]
Mathew et al.

[11] Patent Number: 6,122,033
[45] Date of Patent: Sep. 19, 2000

[54] FUSIBLE SEAL FOR LCD DEVICES AND METHODS FOR MAKING SAME

[75] Inventors: Ranjan J. Mathew, San Jose; Hem P. Takiar, Fremont, both of Calif.

[73] Assignee: National Semiconductor Corporation, Santa Clara, Calif.

[21] Appl. No.: 09/056,165

[22] Filed: Apr. 6, 1998

[51] Int. Cl.$^7$ ............................................. G02F 1/133
[52] U.S. Cl. ........................ 349/155; 349/190; 350/160; 277/628
[58] Field of Search ................................... 277/233, 931, 277/654, 650, 942, 941, 939; 349/153, 155, 86, 190, 156; 445/25; 252/511, 512; 29/25.35, 525.14, 423, 422

[56] References Cited

U.S. PATENT DOCUMENTS

| | | | |
|---|---|---|---|
| 3,834,791 | 9/1974 | Raimbault | 350/160 |
| 3,939,556 | 2/1976 | Borel et al. | 349/190 |
| 3,992,082 | 11/1976 | Katz | 350/160 |
| 4,007,077 | 2/1977 | Yaguchi | 156/145 |
| 4,050,786 | 9/1977 | Feldman | 350/160 |
| 4,252,415 | 2/1981 | Klein et al. | 350/343 |
| 4,469,410 | 9/1984 | Ikesue | 350/343 |
| 5,059,148 | 10/1991 | McKenna et al. | 349/190 |
| 5,492,762 | 2/1996 | Hirai et al. | 428/447 |
| 5,680,192 | 10/1997 | Burrell et al. | 349/152 |
| 5,905,552 | 5/1999 | Yoshida et al. | 349/86 |
| 5,982,471 | 11/1999 | Hirakata | 349/155 |

*Primary Examiner*—Anthony Knight
*Assistant Examiner*—Mark Williams
*Attorney, Agent, or Firm*—Beyer Weaver & Thomas, LLP

[57] ABSTRACT

The present inventions provide a fusible seal for sealing liquid crystal display (LCD) devices. A fusible seal is formed on a transparent plate or on a die having a pixel array. The fusible seal is configured to encircle the pixel array of the die when the die and the transparent plate are joined. The die and the transparent plate are joined together such that the fusible seal is disposed between the transparent plate and the die. Heat is locally applied to the fusible seal without significantly heating the transparent plate or the die. Heating the fusible seal fuses the transparent plate to the die and encloses the pixel array. A LCD device is thereby formed without the need to cure the entire LCD device, which often times causes warping of the LCD device.

51 Claims, 14 Drawing Sheets

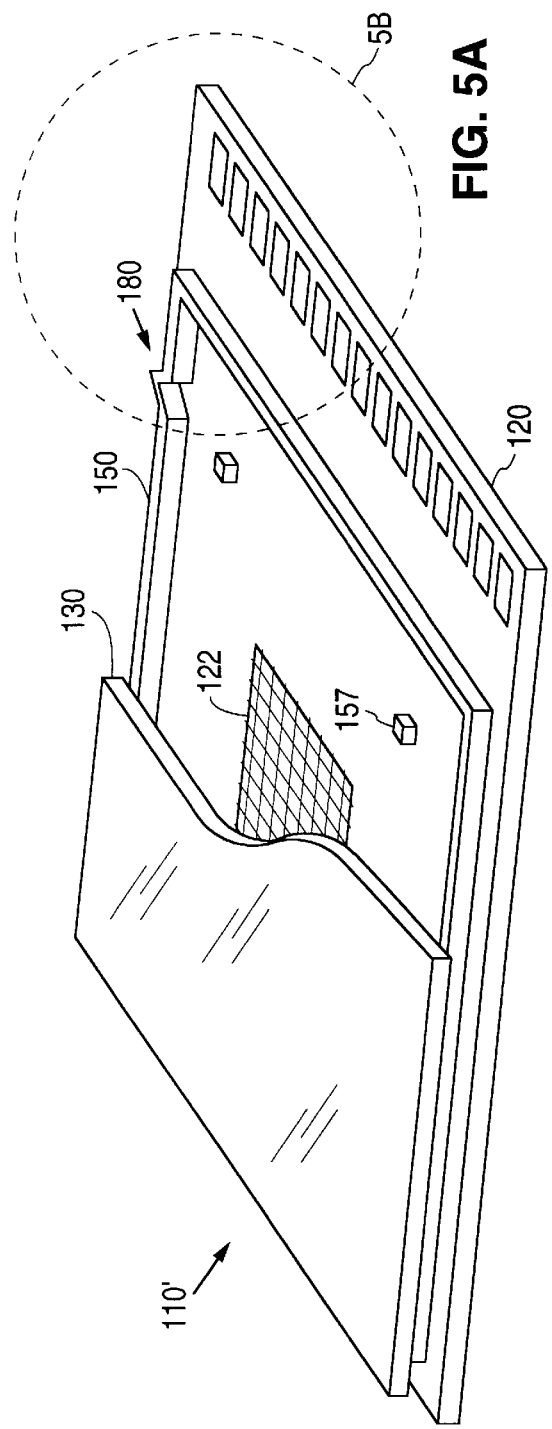
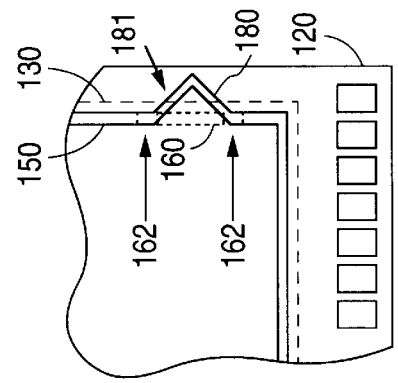
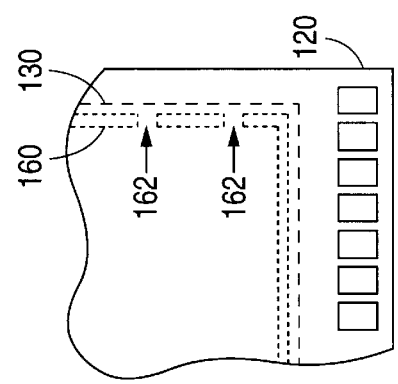
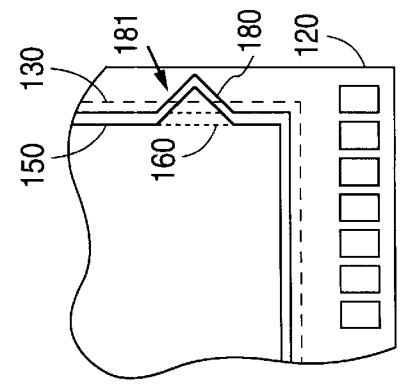
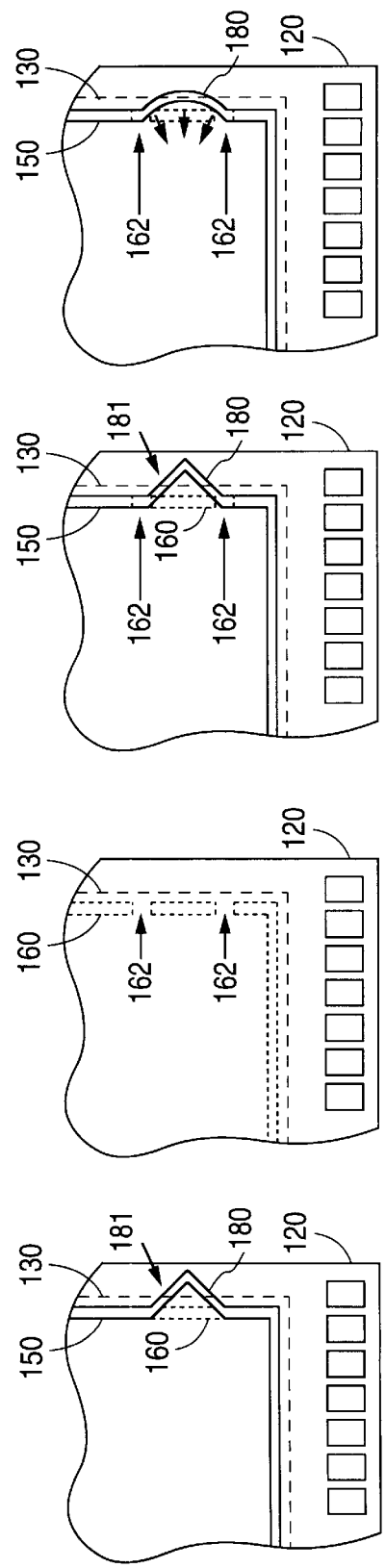

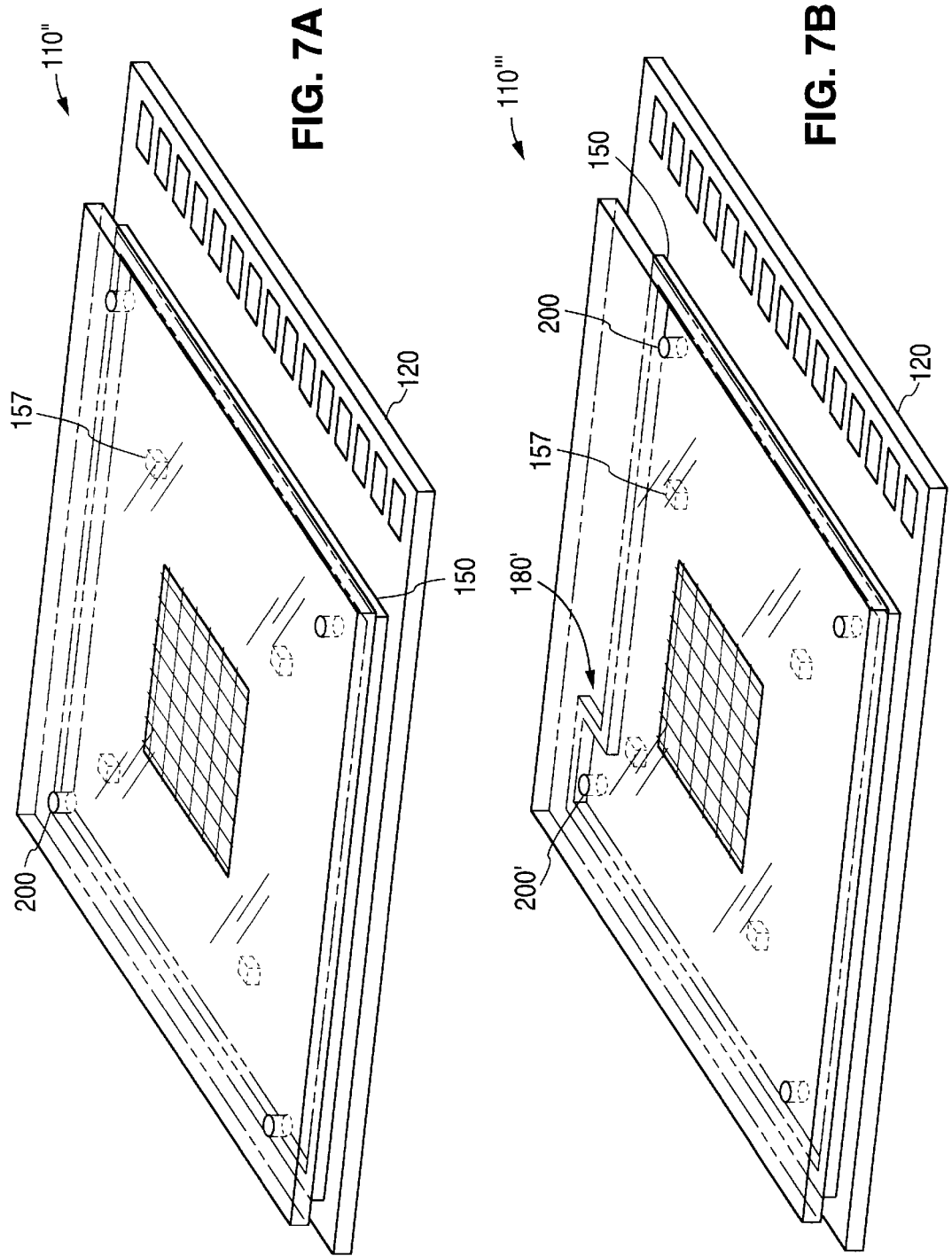

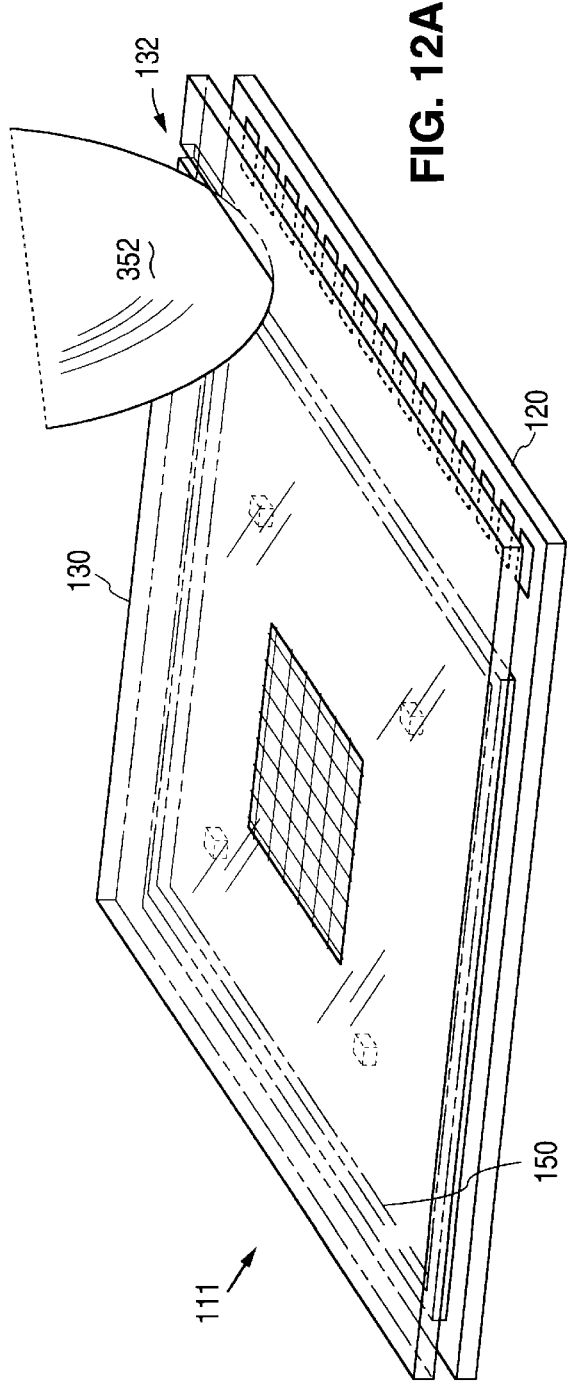
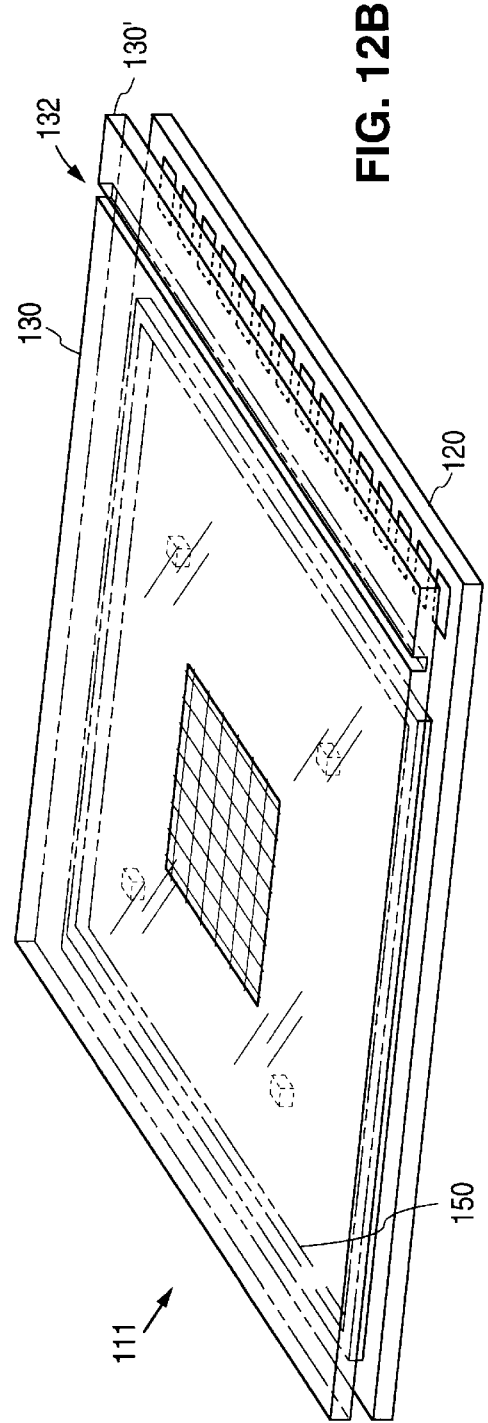

FUSIBLE SEAL FOR LCD DEVICES AND METHODS FOR MAKING SAME

BACKGROUND OF THE INVENTION

The present inventions relate generally to liquid crystal displays (LCDs). More specifically to methods and apparatuses for sealing LCD devices.

Until recently LCD devices were primarily flat panel devices, such as those used in portable computers. Referring initially to FIG. 1A, a diagrammatic perspective view of a portion of a flat panel LCD device 1 is shown. Flat panel device 1 includes two transparent panels 2 and 4. Pixel array layer 3 lies between glass plates 2 and 4. The pixel array layer typically contains an array of pixels 6.

The pixels are interconnected by connections within pixel array layer 3. By switching on the appropriate pixels 6 light is either allowed or stopped from passing through glass plates 2 and 4. The pixels cause liquid crystals in a liquid crystal material contained between the glass plates to either align or disperse, causing the visual effect. The operation of the pixel array is dependent upon the distance between pixel array layer 3 to the opposite glass plate 2, as is known in the art. FIG. 1A depicts three pixels 6 that have been switched to stop light from passing through the transparent panels, thus appearing dark.

FIG. 1B is a diagrammatic cross-section of the flat panel LCD device of FIG. 1A taken along the line 1B—1B. Between the glass plates and along the perimeter of the flat panel LCD device a seal 9 is generally formed to enclose the liquid crystal material. Spacers 8 are also contained between the glass plates. Spacers 8 are typically spherical in shape and transparent and generally on the order of 2–4 microns in diameter. Pixels 6 are on the order of 100 microns in length/width separated by 2–4 micron gaps. The spacers cause little visual interference with the functioning of the pixel array because of the difference in sizes.

Another vital role of the spacers is to maintain the flatness of the glass plates. Since the spacers are dispersed throughout the LCD flat panel device the glass plates are kept apart from each other at a uniform distance. Variances in the separation of the glass plates may often times cause the pixel array to function improperly or stop functioning at all.

Today, small scale LCD devices, such as light valves are becoming more prominent. Small scale LCD devices, and light valves are typically manufactured according to certain specifications to ensure that they function properly. One criteria is that the distance between the pixel array and the opposite glass plate be uniform.

Referring to FIG. 2A, a typical small scale LCD device 10 includes a die 20 containing a pixel array 22. Pixel array 22 is typically composed of rows and columns of electrically conductive pathways. At the intersection of a row and a column of the electrically conductive pathways is a pixel 23 (see FIG. 2B). Each pixel 23 can be turned on individually by selecting the appropriate row and column of pixel array 22. Selection of a pixel 23 is controlled by control circuitry, either included within the die 20 or external to the die 20. In both cases, external control signals may be used to control the functions of the die 20. Bond pads 25, are usually placed around pixel array 22, and typically connected to the pixel array 22 to allow control of the operation of the pixel array 22.

Bond pads 25 are electrically coupled to pixel array 22 by circuitry that is normally internal to the die 20. A glass plate 30 is typically placed over die 20 and pixel array 22, such that the glass plate 30 overhangs the die 20, and may cover an area of die 20 that could have contained bond pads 25. The placement of bond pads 25 are often concentrated to one or two sides of die 20, such that the glass plate 30 does not cover the bond pads 25.

Die 20 is typically mounted to a substrate 80. Substrate 80 includes a plurality of substrate pads 85. Bond pads 25 typically are wire bonded to the substrate pads 85 by bonding wires 90.

A suggested practice in the manufacture of an LCD device 10 is to ground a side of glass plate 30 facing pixel array 22 in order to assure that LCD device 10 functions properly. Grounding of the bottom surface of glass plate 30 allows for a proper electric field to be created between the glass plate 30 and the pixel array 22.

Common methods of grounding glass plate 30 include using a conductive epoxy 70 to electrically couple the conductive coating 40 to substrate 80, upon which die 20 is attached. Conductive epoxy 70 is typically placed on substrate 80 under where glass plate 30 overhangs die 20. Often times, however, conductive epoxy 70 does not make a good connection with the glass plate 30 or the substrate 80, which makes LCD device 10 inoperable. Attaching conductive epoxy 70 also includes several process steps in the manufacture of LCD device 10.

Referring to FIG. 2B, a cross-section of the LCD device 10 of FIG. 2A along line 2b—2b is shown. The glass plate is usually affixed to die 20 by an adhesive seal 50. Glass plate 30 may or may not have a conductive coating on the side opposite the pixel array. The sealed area between glass plate 30 and pixel array 22 is commonly filled with a solution of polymer dispersed liquid crystals 60. After die 20 is properly affixed with glass plate 30, die 20 is attached and coupled to substrate 80, and sealed. Typically, a glob coating is used to seal die 20 to substrate 80. The glob coating 95 normally encapsulates the bonding wires 90 and the internal elements of die 20, without obscuring a view of pixel array 22 through glass plate 30.

In addition to grounding glass plate 30, another recommended practice is to place glass plate 30 over pixel array 22 at a precise height. The strength of the electric field is dependent upon the distance between the grounded glass plate 30 and pixel array 22. The electric field causes the liquid crystals 60 to align properly and creates the desired visual effect in the display of the LCD device 10. Since the electric field created by a pixel typically cannot be varied after assembly of LCD device 10, glass plate 30 should be precisely positioned over the pixel array 22.

Unlike large LCD devices, spacers typically cannot be distributed throughout the LCD device due to the difference in dimensions. Generally, the required distance between glass plate 30 and die 20 is about 2–4 microns. However, the size of the pixels in a small scale LCD device is on the order of 10–12 microns, with gaps of about 5–10 microns. Spacers on the size of about 2–4 microns, as used in larger scale LCD devices, would obscure the visibility of the pixels and cause distortion in small scale LCD devices.

One method of spacing the glass plate from the die in small scale LCD devices has been to utilize non-conductive spacers. Typically, glass plate 30 is separated from pixel array 22 by a non-conductive spacer (not shown). Non-conductive spacer is typically manufactured separately from die 20. The non-conductive spacer is normally placed on die 20 prior to affixing the glass plate. However, it is typically difficult to obtain the precise required height. Additionally, difficulties normally exist concerning the proper placement of the non-conductive spacer on die 20.

Another method of spacing glass plate 30 over pixel array 22 is to use a plurality of non-conductive spacers within an adhesive seal 50. Non-conductive spacers are interspersed throughout adhesive material 50, used to seal glass plate 30 above pixel array 22. It is, however, typically difficult to ensure that non-conductive spacers are adequately positioned to create a uniformly spaced height throughout the adhesive seal 50. Non-conductive spacers have been found to have a tendency to come out of solution with the adhesive seal 50, which may cause the height of the adhesive seal 50 to be greater than the required height. Alternatively, portions of the adhesive seal 50 may be void of non-conductive spacers and cause glass plate 30 to sag below the required height in a particular area.

Yet another method of spacing glass plate 30 from pixel array 22 is to simply use the adhesive seal 50 without any non-conductive spacers. The height of the separation is measured in that approach. This method is typically more cumbersome, less reliable, and requires many additional process steps to achieve the desired result.

While these methods of spacing the glass plate from the die in small scale LCD devices serve their function, albeit inefficiently, another problem arises from their use. Typically, not all the area between the glass plate and the die is sufficiently spaced. When the LCD device is cured in order to cure seal 50, the LCD device is often times warped, referring now to FIG. 2C.

FIG. 2C is a cross-sectional view of die 20 with an attached glass plate 30 prior to being mounted on a substrate. When the die and the attached glass plate are parallel before being cured. Curing of the seal normally requires that the entire LCD device be placed in a heated environment. During curing one or both of the die or glass plate may warp due to their different coefficients of expansion. If the glass plate and the die were separated upon cooling they might return to their original shapes. But, since the glass plate and the die are attached to each other by seal 50 the warped piece (either the die or the glass plate) remains warped.

FIG. 2D is a close up view of a cross-section of seal 50 of FIG. 2C. During the curing process seal 50 conforms to the shape of die 30 and glass plate 20 to which it is in contact. Often times the seal maintains that shape, even when one of the die or glass plate is warped or bowed. Thus, the warped piece is prevented from returning to its original planar shape due to the curing of the seal in the warped shape, as depicted in exaggerated detail in FIG. 2D.

Therefore, while the present methods of spacing and sealing an LCD device offers some benefits they also present many problems. A desire exists to properly seal a glass plate to a die of a small scale LCD device without warping or bowing. At the same time the glass plate must be precisely placed above the die in order for the LCD device to function properly. Additionally, it would be beneficial to provide methods and apparatuses that may be able to perform these and other processing steps on a wafer scale rather than at the individual device level.

SUMMARY OF THE INVENTION

The present inventions provide a fusible seal for sealing liquid crystal display (LCD) devices. A fusible seal is formed on a transparent plate or on a die having a pixel array. The fusible seal is configured to encircle the pixel array of the die when the die and the transparent plate are joined. The die and the transparent plate are joined together such that the fusible seal is disposed between the transparent plate and the die. Heat is locally applied to the fusible seal without significantly heating the transparent plate or the die. Heating the fusible seal fuses the transparent plate to the die and encloses the pixel array. A LCD device is thereby formed without the need to cure the entire LCD device, which often times causes warping of the LCD device.

In another embodiment, an LCD device is formed with a fusible seal and filled with a liquid crystal material. The transparent plate may include one or more entry/exit holes to allow the passage of liquid crystal material into the volume enclosed by the transparent plate, the die and the fusible seal. Once the enclosed volume is filled with liquid crystal material the entry/exit holes are sealed. In one embodiment, a sealant is used to fill the entry/exit holes. In another embodiment, a lid with a fusible lid seal is used to seal the entry/exit holes.

A fusible seal is formed on the die, creating a reservoir around the pixel array, and the reservoir is filled with liquid crystal material in an alternative embodiment of the present inventions. The transparent plate is then placed over the fusible seal enclosing the liquid crystal materials. The fusible seal is locally heated forming a continuous seal between the transparent plate and the die.

In another embodiment, the fusible seal is configured to form a seal intake aperture. The fusible seal is shaped to partially extend out from beneath the transparent plate when the transparent plate is affixed to the fusible seal and the die. The fusible seal is locally heated to fuse the transparent plate to the die without heating the partial extension of the fusible seal forming the seal intake aperture. The partial extension of the fusible seal provides a seal intake aperture which allows the passage of liquid crystal materials into and out of the area enclosed by the transparent plate, the die and the fusible seal. The partial extension of the fusible seal is then heated and wicked back under the transparent plate forming a continuous seal between the transparent plate and the die.

In yet another embodiment, the fusible seal is used in conjunction with an entry/exit hole. The fusible seal is configured to provide the entry/exit hole with access to the volume enclosed by the transparent plate, the die and the fusible seal. The enclosed volume is filled with liquid crystal materials. After filling, a portion of the fusible seal is locally heated to exclude the entry/exit hole from access to the enclosed area.

A fusible seal and the alternative methods of filling the LCD device with liquid crystal materials, made possible by the flexibility of the fusible seal, also allows for the wafer scale fabrication of LCD devices.

These and other advantages of the present inventions will become apparent to those skilled in the art upon a reading of the following descriptions of the invention and a study of the several figures of the drawing.

BRIEF DESCRIPTION OF THE DRAWINGS

FIG. 5A is a perspective view of an LCD device in accordance with an embodiment of the present inventions.

FIG. 5B is a top plan view of the region 5B circled in FIG. 5A in accordance with an embodiment of the present inventions.

FIG. 5C is a top plan view of the region 5B circled in FIG. 5A in accordance with another embodiment of the present inventions.

FIG. 5D is the figure of 5C with a fusible material forming a seal intake in accordance with an embodiment of the present inventions.

FIG. 5E depicts the enclosure of the seal intake of FIG. 5D in accordance with an embodiment of the present inventions.

FIG. 7A is a diagrammatic perspective view of an LCD device in accordance with an alternative embodiment of the present inventions.

FIG. 7B is a diagrammatic perspective view of an LCD device in accordance with yet another embodiment of the present inventions.

FIG. 12A is a diagrammatic perspective view of a singulated LCD device being scored in accordance with an embodiment of the present inventions.

FIG. 12B is a diagrammatic perspective view of the die of FIG. 12A with a completed score in accordance with an embodiment of the present inventions.

DETAILED DESCRIPTION OF THE PREFERRED EMBODIMENTS

The present inventions provide a fusible seal for use in LCD devices. The fusible seal prevents the problems associated with epoxy and other types of prior art seals. The effects of bowing of a LCD die and/or a transparent plate are significantly reduced. A fusible seal also provides a precisely spaced seal, especially when used in conjunction with spacers. Fusible seals allow for unique and novel methods of filling the LCD device with liquid crystal material. On a larger scale, the use of fusible seals allows for wafer level processing of LCD devices as opposed to device level processing typically required by prior art methods.

Fusible Seal

Figure 1A:
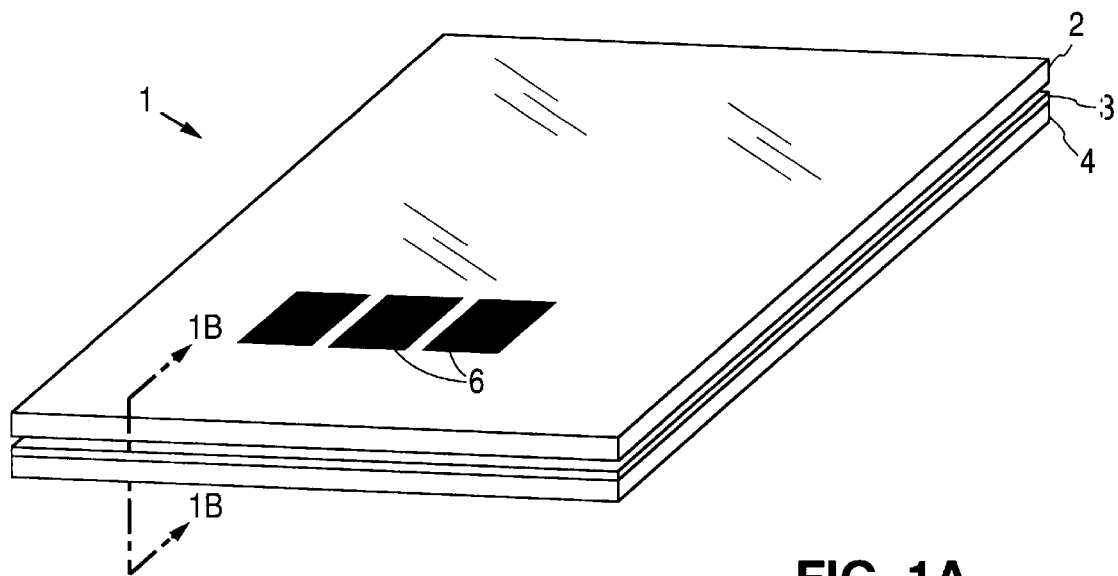
FIG. 1A is a diagrammatic perspective view of a portion of a prior art flat panel LCD device.
Figure 1B:
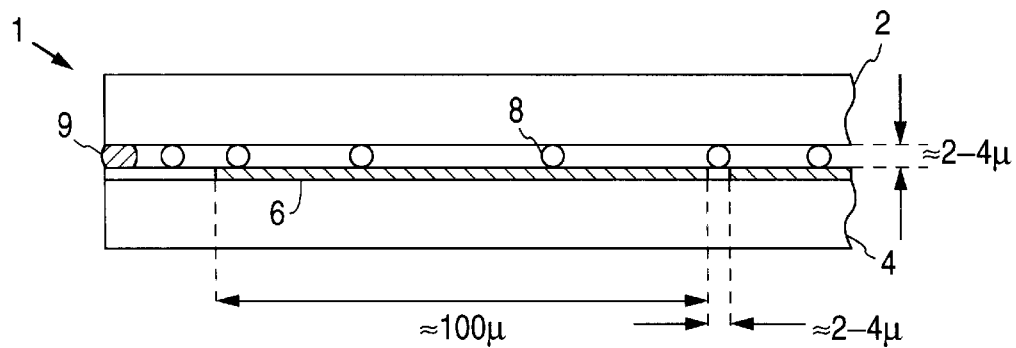
FIG. 1B is a diagrammatic cross-sectional view of the flat panel LCD device of FIG. 1A taken along the line 1B—1B.
Figure 2A:
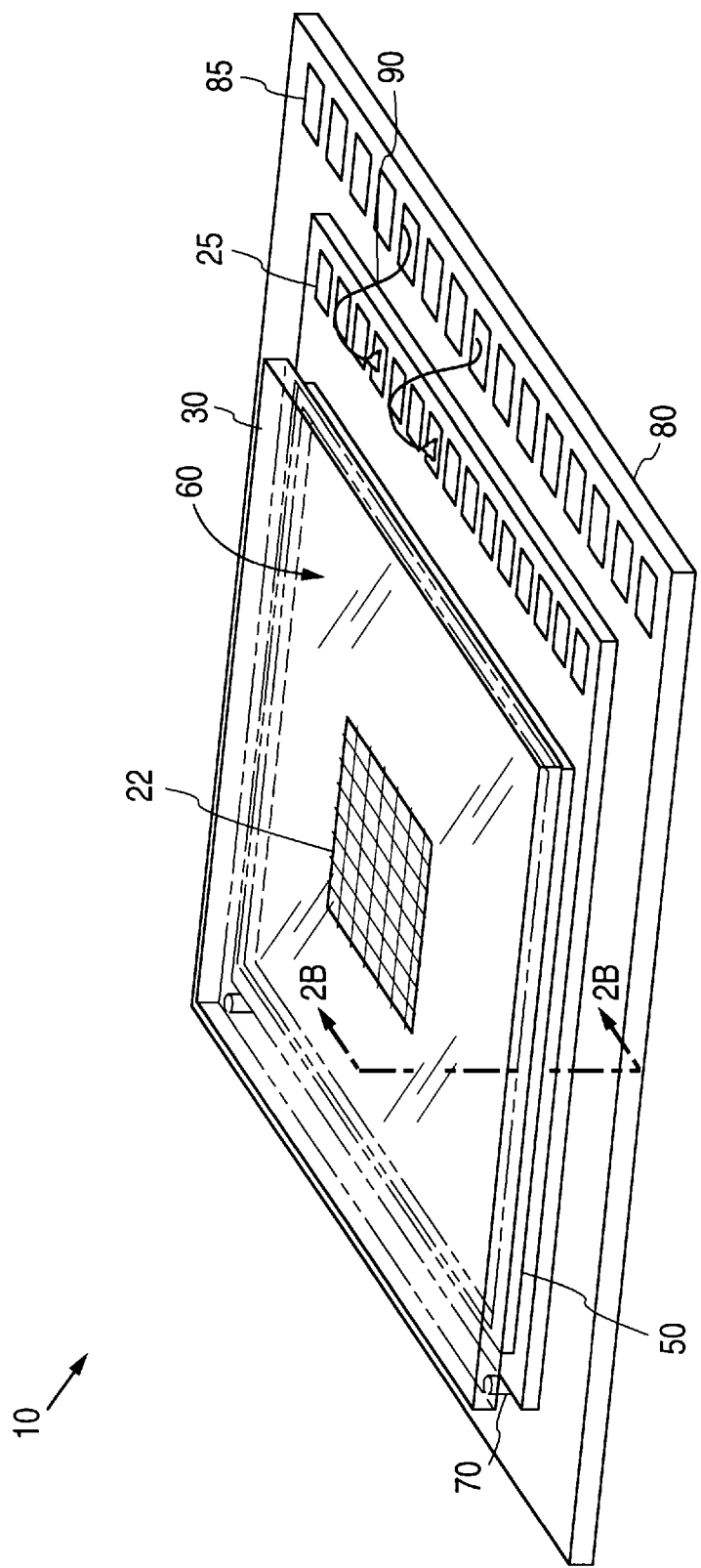
FIG. 2A is a diagrammatic perspective view of a prior art small scale LCD device.
Figure 2B:
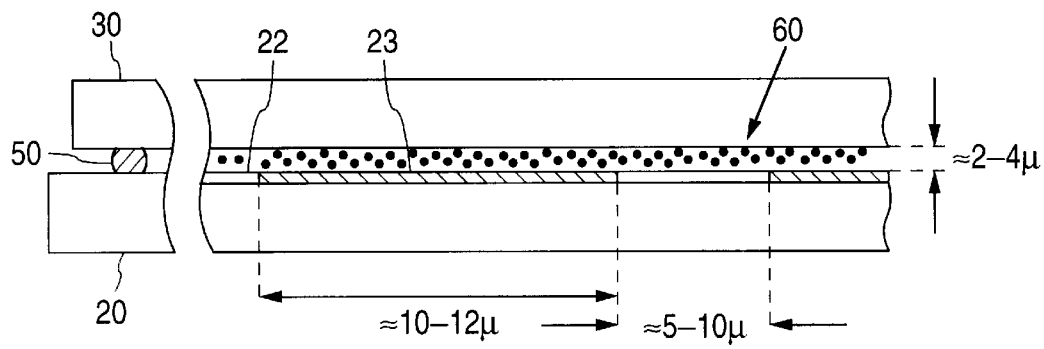
FIG. 2B is a cross-sectional view of the LCD device of FIG. 2A along line 2B—2B.
Figure 2C:
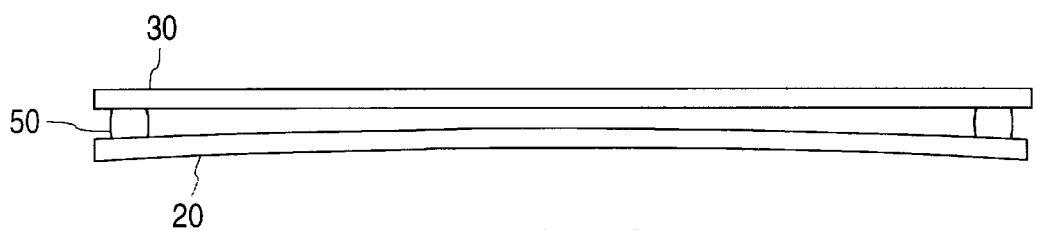
FIG. 2C is a cross-sectional view of the die and glass plate of FIG. 2B prior to being mounted on a substrate.
Figure 2D:
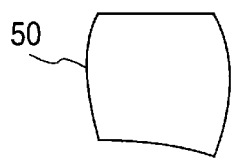
FIG. 2D is an enlarged view of a cross-section of the seal of FIG. 2C.
Figure 3A:
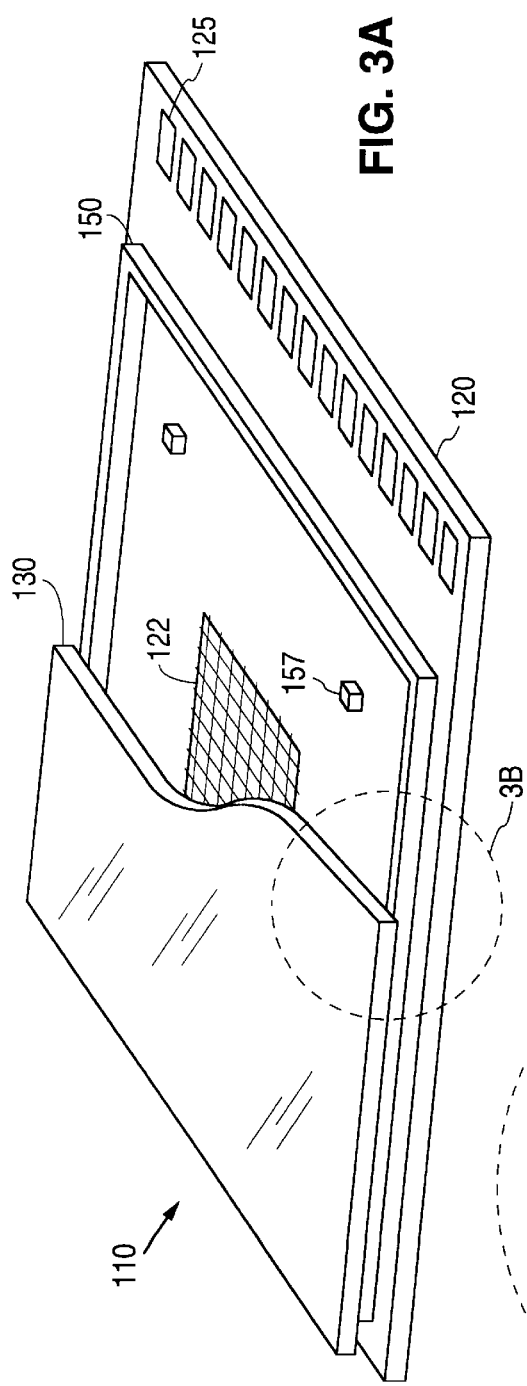
FIG. 3A is a diagrammatic perspective view of a LCD device with a transparent plate, partially cut away for illustrative purposes, in accordance with an embodiment of the present inventions.

FIG. 3A is a diagrammatic perspective view of a small scale LCD device 110 with a transparent plate 130 partially cut away for illustrative purposes. Small scale LCD device 110 includes a pixel array 122 formed on a die 120. Bond pads 125 are coupled to pixel array 122 through circuitry included on die 120. Surrounding pixel array 122 is a fusible material 150. Fusible material 150 is typically formed on traces 160 (shown in FIG. 3C) that are also formed on die 120. Precision conductive spacers 157 may be placed either within the area enclosed by fusible material 150 or outside the enclosed area. Precision conductive spacers are discussed in detail in co-pending U.S. patent application Ser. No. 08/925,846, entitled "Precision Conductive Spacers for Liquid Crystal Display Devices and Methods for Making Same" by Ranjan J. Mathew, filed on Sep. 8, 1997, Attorney Docket No. NSC1P095, which is incorporated herein by reference in its entirety. Transparent plate 130 is placed on top of fusible material 150 and precision conductive spacers 157.

Transparent plate 130 is cut away for illustrative purposes, however it is appreciated that transparent plate 130 covers the entire area enclosed by fusible material 150. Transparent plate 130 rests on fusible material 150 and precision conductive spacers 157. Fusible material 150 forms a seal around the volume formed between transparent plate 130 and die 120. The interior of the volume is filled with liquid crystal materials, as discussed further below. The seal formed by fusible material 150 allows the LCD device to operate properly.

Unlike seals used in prior art LCD devices, fusible material 150 is not formed from an epoxy or other-types of materials that require curing As discussed, curing requires that the entire LCD device be placed in a high temperature environment in order to cure an epoxy seal.

In one embodiment of the present inventions, fusible material 150 is locally heated such that the die and the transparent plate are not heated. Localized heating causes the fusible material to form a seal around the enclosed volume without heating the entire LCD device. This prevents the bowing effects that arise during the curing process typically utilized in the manufacture of prior art devices.

Figure 3C:
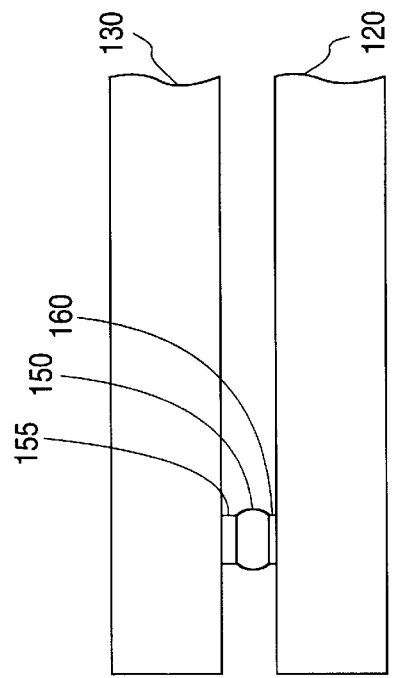
FIG. 3C is a diagrammatic cross-sectional view of FIG. 3B taken along the lines 3C—3C in accordance with an embodiment of the present inventions.
Figure 3B:
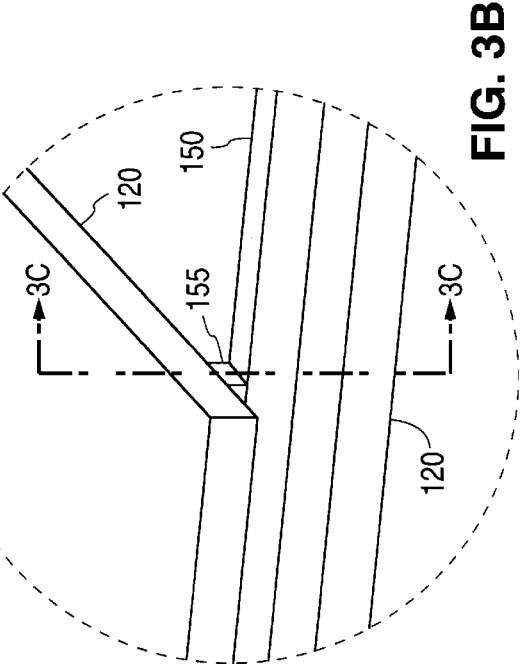
FIG. 3B is an enlarged view of region 3B in FIG. 3A in accordance with an embodiment of the present inventions.

Referring now to FIGS. 3B and 3C, enlarged views of the interface between transparent plate 130 and fusible material 150 are shown. FIG. 3B is an enlarged view of region 3B in FIG. 3A, and FIG. 3C is a diagrammatic cross-sectional view of FIG. 3B taken along the lines 3C—3C. Transparent plate 130, as shown in FIGS. 3B and 3C, includes a top seal 155. Top seal 155 is formed in a shape corresponding to the shape of fusible material 150.

Trace 160 is formed on die 120 in a shape that mirrors the image of top seal 155. Fusible material 150 is formed on trace 160 on die 120. Transparent plate 130 is placed on top of fusible material 150, such that top seal 155 is in contact with fusible material 150. Fusible material 150 is then locally heated causing fusible material 150 to bond with top seal 155. In alternate embodiments, precision conductive spacers 157 may be utilized to appropriately space the transparent plate from the die. In another embodiment, the dimensions of fusible seal 150 and top seal 155 may be adjusted to form a seal of a precise height, such that spacers may not be required. The result is a fused seal between the transparent plate and the die enclosing the pixel array without having to cure the entire LCD device.

FIGS. 4A–4E illustrate the steps of sealing LCD device 110 in accordance with one embodiment of the present inventions. Trace 160 is initially formed on die 120. Trace 160 may be formed in any suitable pattern, such that trace 160 forms a perimeter around pixel array 122. Trace 160, by way of example, may be any suitable material to which solder may wet. For example, trace 160 may be formed from copper, aluminum, nickel, nickel-vanadium, titanium or titanium-tungsten or any other suitable material.

Once trace 160 is formed on die 120, fusible material 150 may be formed on top of trace 160. Fusible seal 150 may be comprised of any suitable material that is capable of being fused. By way of example, fusible material 150 may be formed from tin, a tin-lead, indium-tin, tin-indium-lead or any other suitable fusible material. Fusible material 150 may be formed on trace 160 by any suitable means, for example, sputtering, deposition, simple physical placement on trace 160, precision ball bond placement and similar methods may be utilized in accordance with the present inventions. In some embodiments fusible material 150 need not be precisely shaped because the fusible material will be reflowed in the fusing process.

Top seal 155 may be formed on transparent plate 130 in a pattern corresponding to the pattern of trace 160 on die 120. In the illustrated embodiment, precision conductive spacers 157 are formed on transparent plate 130 rather than on die 120.

Figure 4A:
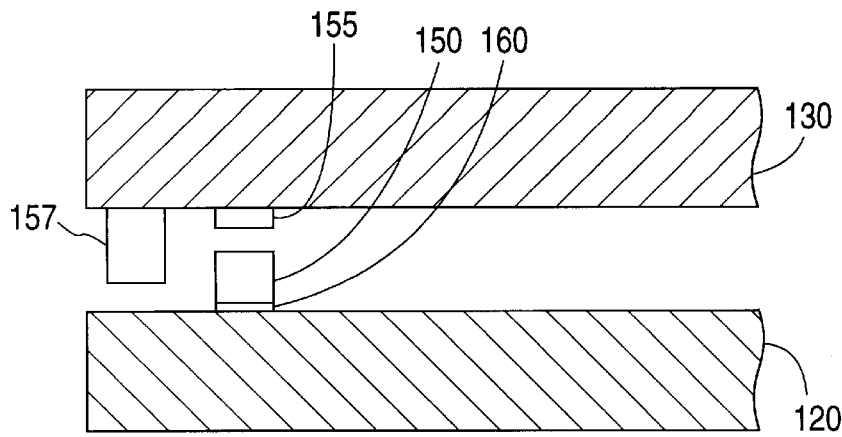
FIG. 4A is a cross-sectional view of a transparent plate being placed on an LCD die in accordance with an embodiment of the present inventions.
Figure 4B:
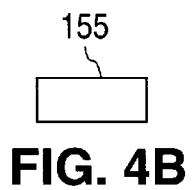
FIG. 4B is across-sectional view of a top seal in accordance with an embodiment of the present inventions.
Figure 4C:
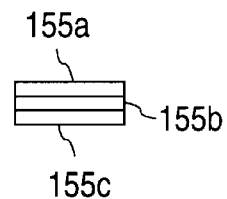
FIG. 4C is a cross-sectional view of a multi-layered top seal in accordance with an alternative embodiment of the present inventions.

Referring now to FIGS. 4B and 4C, top seal 155 may be a single layer or multi-layered. FIG. 4B is a cross-section of top seal 155 that is formed from a single layer, in accordance with an embodiment of the present inventions. A single layer top seal 155 may be formed from any suitable material that can be bonded to transparent plate 130 and subsequently bonded to fusible material 150. By way of example, a single layer top seal 155 may be formed from gold, tin, titanium, nickel, nickel-vanadium, titanium-tungsten, or any other suitable material.

FIG. 4C is a cross-section of a multi-layered top seal 155 having a top layer 155a, a middle layer 155b, and a bottom layer 155c. Top layer 155a may be comprised of a material suitable for bonding to transparent plate 130. Also, top layer 155a acts as an oxidation layer between transparent plate 130 and the subsequent layers of top seal 155. By way of example, top layer 155a may be formed from gold, platinum, palladium, silver, silver-tin combination or any other suitable material.

In some embodiments, these materials may not be the most optimal materials to fuse with fusible material 150 in subsequent steps. Therefore, a middle layer 155b is sometimes required. Middle layer 155b provides an interface layer between top layer 155a which is bonded to transparent plate 130 and a bottom layer 155c which will be fused to fusible material 150. Middle layer 155b, by way of example may be formed from nickel, tin, tin-nickel, copper or any other suitable materials.

Bottom layer 155c is then formed on middle layer 155b. Bottom layer 155c is formed from materials that readily wet with fusible material 150. By way of example, bottom layer 155c can be formed from tin, tin-lead, tin-indium, tin-lead-indium or any other suitable materials.

While top layer 155a is depicted as being on top of middle layer 155b and bottom layer 155c, top layer 155a is only depicted as being on top for purposes of illustration. Most commonly, top layer 155a is formed first on transparent plate 130 and the subsequent layers 155b and 155c are formed over top layer 155a. Methods for forming individual layers 155a, 155b and 155c, as well as the single layer top seal 155, may be accomplished by methods known in the art. By way of example, shadow masking, deposition and etching, sputtering, evaporation or any other suitable techniques for forming metallic layers on transparent plate 130 may be utilized in accordance with the present inventions. Further, a top seal 155 may have any number of suitable layers.

Precision conductive spacers 157 may also be placed on transparent plate 130 prior to assembly of transparent plate 130 to die 120. As noted, methods and apparatuses for forming precision conductive spaces are described in a co-pending application. Precision conductive spacer 157 may also be formed on die 120 rather than on transparent plate 130. Additionally, precision conductive spacers 167 may be formed anywhere within the area covered by transparent plate 130 or die 120 so long as the precision conductive spacers perform their function of spacing transparent plate 130 from die 120.

Figure 4D:
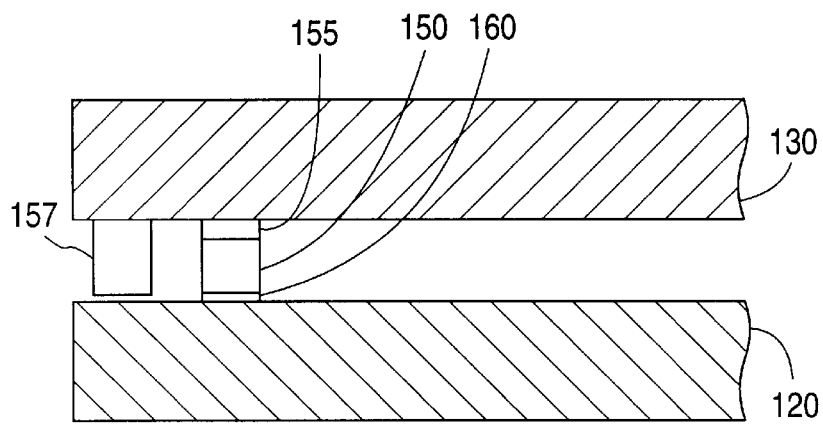
FIG. 4D is the cross-sectional view of a transparent plate being placed on an LCD die of FIG. 4A in a further stage of the process in accordance with an embodiment of the present inventions.

Referring now to FIG. 4D, transparent plate 130 with top seal 155 and spacer 157 is placed on top of fusible material 150 on die 120. The height of fusible material 150 and top seal 155 is greater than the height of spacer 157, in one embodiment. Thus, there is a gap between die 120 and spacer 157 prior to fusing fusible material 150.

Figure 4E:
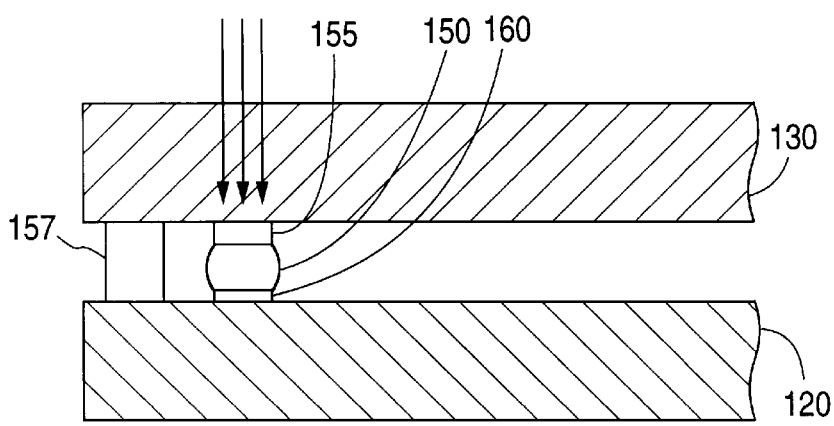
FIG. 4E is the cross-sectional view of a transparent plate being placed on an LCD die of FIG. 4D in a further stage of the process in accordance with an embodiment of the present inventions.

In FIG. 4E, the application of heat to fusible material 150 is depicted. After transparent plate 130 has been matched to die 120 heat is applied to the areas covered by fusible material 150. Rather than heating the entire LCD device, which often times leads to bowing, distortion, and other harmful side effects as in prior art methods of sealing an LCD device, in one embodiment of the present inventions only the areas covered by fusible material 150 are heated.

The heat applied to the fusible material 150 causes fusible material 150 to wet and fuse with top seal 155. Fusible material 150 also wets and bonds with trace 160, if fusible material 150 has not already been fused to trace 160. The weight of transparent plate 130, in one embodiment, is enough to cause transparent plate 130 to move closer to die 120 until spacer 157 comes in contact with die 120. Also, the surface tension of the wetted fusible material may cause transparent plate 130 to be pulled down closer to die 120. In another embodiment, a force may be applied to transparent plate 130 to bring it closer to die 120.

Whether it is the surface tension of fusible material 150 in its molten state or the effect of gravity, transparent plate 130 is uniformly pulled closely to die 120. In combination with the strategic placement of spacers 167, transparent plate 130 is bonded to die 120 in such a manner that transparent plate 130 is at a uniform distance from die 120. Therefore, many of the side effects associated with curing the entire LCD device and imperfect sealing of transparent plate 130 to die 120 is avoided by the present inventions.

Fusible material 150 may be heated through any suitable means of heating localized areas on a die. By way of example, infrared, ultraviolet, or visible light lasers may be used to apply heat to fusible material 150. Additionally, ion beam, pulsed thermode and other suitable means of localized heating may be utilized in accordance with the present inventions. Localized heating of fusible material 150 to fuse transparent plate 130 to device 120 avoids the problem of heating the entire LCD device, as discussed.

Filling

A fusible seal also provides other opportunities in economizing the fabrication of an LCD device. Referring now to FIG. 5A, a perspective view of an LCD device 110' in accordance with another embodiment of the present inventions is shown. LCD device 110' is similar to LCD device 110 in FIG. 3A. However, LCD device 110' includes a fusible material 150 having a seal intake 180. Seal intake 180 protrudes from underneath transparent plate 130 providing an aperture into the enclosed area between transparent plate 130 and die 120. The aperture allows for the ingress or egress of liquid crystal material during subsequent steps of the fabrication of LCD device 110'.

Now referring to FIG. 5B, a top plan view of the region 5B circled in FIG. 5A is depicted. Seal intake 180 as seen in FIG. 5B, protrudes out from under transparent plate 130. Aperture 181 is thereby formed allowing an entrance or an exit hole for liquid crystal material to be inserted into the enclosed volume formed by transparent plate 130, die 120 and fusible material 150.

During the heating of fusible material 150, in one embodiment of the present inventions, heat is applied to all portions of fusible material 150 except for the portions of seal intake 180 that extend out from transparent plate 130. This allows transparent plate 130 to be appropriately bonded to die 120 at a precise distance, while at the same time leaving aperture 181 unobstructed. Once the enclosed area is filled with liquid crystal materials heat may be applied to the previously unheated portions of seal intake 180, and the corresponding portions of top seal 155 and trace 160. The subsequent heating causes the seal intake portion of fusible material 150 to wet to trace 160. The protruding portions of seal intake 180 are thereby drawn back under transparent plate 130 forming a complete seal.

FIG. 5C is a top view of the region 5B circled in FIG. 5A with the fusible seal removed for illustrative purposes, in accordance with another embodiment of the present inventions. In FIG. 5B, trace 160 was continuous, however it may be preferable to have gaps 162 along portions of trace 160. Referring now to FIG. 5D, which includes fusible material 150, gaps 162 are located such that they underlie the turning point of seal intake 180 from the route of trace 160. Gaps 162 are formed under the turning points in seal intake 180 in order to prevent significant wetting of the fusible material in seal intake 180 during the initial fusing process. As in the discussion in reference to FIG. 5B, only portions of seal intake 180 that directly underlie transparent plate 130 are initially locally heated. This may include portions of seal intake 180 that are immediately adjacent to the rest of fusible material 150. By removing portions of trace 160 seal intake 180 is prevented from being significantly wetted to trace 160 before the enclosed area is filled with liquid crystal materials.

Once transparent plate 130 has been affixed to die 120 by way of fusible seal 160, the enclosed area therein may be filled with liquid crystal materials through seal intake 180 and aperture 181. Once the enclosed area has been sealed with liquid crystal material the seal intake may then be fused to complete the seal formed by fusible material 150.

FIG. 5E is a diagrammatic top plan view of seal intake 180 being fused and reincorporated with fusible material 150. In the sealing process, heat is applied to the seal intake portion of fusible material 150 and the portions of 150 adjacent to seal intake 180. Localized heating causes seal intake 180 and the adjacent portions of fusible material 150 to wet and are drawn into the perimeter formed by trace 160 through surface tension. Thus, seal intake 180 is reincorporated into fusible material 150 through the wicking action.

Seal intake 180 may be formed in any shape including the "V" like shape depicted in FIGS. 5B and 5D. By way of example, seal intake 180 may be semi-circular, semi-rectangular, semi-trapezoidal, or any other suitable shape.

Figure 6:
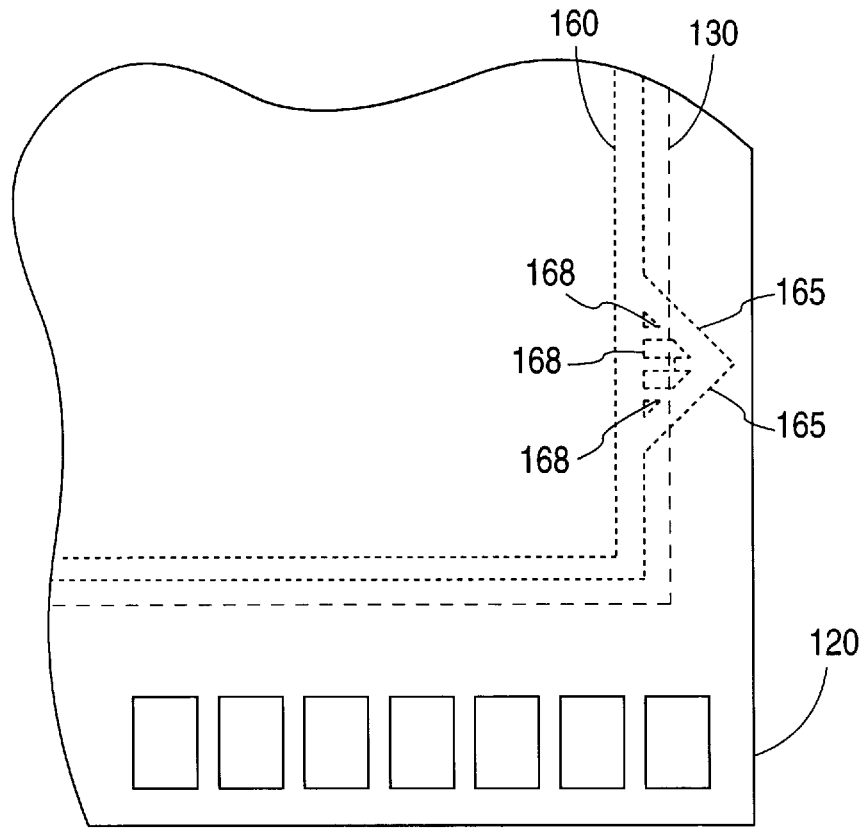
FIG. 6 is a top plan view of the region 5B in FIG. 5A of a LCD die with an alternate embodiment of a trace in accordance with another embodiment of the present inventions.

In an alternate embodiment, it may be desired to provide for better wicking action through special formations of trace 160. FIG. 6 is a top plan view of a similar area as in FIGS. 5B–5E of die 120 with an alternate embodiment of trace 160. In the alternate embodiment, trace 160 includes seal intake traces 165 and channels 168. Seal intake traces 165 mirrors the shape of seal intake 180 of fusible material 150 when initially formed on die 120. Connecting the main portion of trace 160 and seal intake trace 165 are channels 168.

Channels 168 provide a convenient path for seal intake 180 to wick into the main portion of trace 160 in the final sealing process. Seal intake 180 is locally heated to be totally reincorporated with fusible material 150. Localized heat may be applied initially to seal intake 180 directly over seal intake trace 165 and to channels 168 until seal intake 180 has begun to wick. Then heat may be directed towards main trace 160 in order to draw in the fusible material of seal intake 180. The end result is a continuous fusible material 150 formed over the main portion of trace 160, i.e., excluding seal intake traces 165 and channels 168. Thereby, a uniform seal is formed around the volume enclosed between transparent plate 130 and die 120, encapsulating pixel array 122 and liquid crystal materials.

LCD device 110' may be filled with liquid crystal material in any suitable manner while aperture 181 is still present, as known in the art. In one embodiment, LCD device 110' is placed in a low pressure environment. Once acclimated, the pressure inside the volume enclosed by transparent plate 130 die 120 and fusible material 150 is also at a low pressure. Liquid crystal materials kept at a higher pressure may then be introduced into the enclosed area through aperture 181. Because the enclosed area is kept at a lower pressure, a vacuum action takes place sucking in the liquid crystal material into the enclosed area. Seal intake 180 may then be fused and incorporated into fusible material 150 after the enclosed area is filled with the liquid crystal material.

In an alternate embodiment, the enclosed area may be filled through intake and exit holes drilled into transparent plate 130. FIG. 7A is a diagrammatic perspective view of an LCD device 110" in accordance with one embodiment of the present inventions. LCD device 110" includes entry/exit holes 200 drilled into transparent plate 130. Entry/exit holes may be formed within transparent plate 130 by any suitable drilling technique, as known in the art. By way of example, holes 200 may be formed by a slurry water jet, laser drilling, precision drilling, ultrasonic drilling, precision etching or any other suitable means of drilling.

Some of entry/exit holes 200 are used to introduce the liquid crystal material into the enclosed area while the other holes 200 are used to allow air to escape from the enclosed area and any surplus liquid crystal material to exit in the filling process. Alternatively, the method of creating a low pressure within the enclosed area and introducing a liquid crystal material kept at a higher temperature, as discussed previously, may also be utilized in accordance with the particular embodiment of the present inventions.

In another aspect of the present inventions, one of the entry/exit holes 200 may have a volume large enough to contain enough liquid crystal material to fill the enclosed area. While the illustrative figure may not appear so because the dimensions of the depicted embodiment are not exactly to scale, an entry/exit hole 200 may contain enough liquid crystal material to fill the enclosed volume, as may be appreciated by those skilled in the art. Thus, one of the entry/exit holes 200 may be used as a reservoir and filled with liquid crystal material. The liquid crystal material is then allowed to flow from the entry/exit hole used as the reservoir into the enclosed area. The other entry/exit holes allow for air to escape and for any excess amount of liquid crystal material to enter into.

The illustrated entry/exit holes are depicted as being formed in the corners of the enclosed area, however the entry/exit holes may be formed anywhere within the enclosed area so long as they do not interfere with pixel array 122.

Referring now to FIG. 7B, a perspective view of an LCD device 110''' in accordance with another embodiment of the present inventions is shown. LCD device 110''' includes a fusible material 150 including a seal intake 180' that is semi-rectangular in shape. An entry/exit hole 200' is formed in the area surrounded by seal intake 180'. Entry/exit hole 200' may be made larger than the other entry/exit holes 200 in order to contain a large amount of liquid crystal material. Once again liquid crystal material may be inserted into entry/exit hole 200', using entry/exit hole 200' as an reservoir. The liquid crystal material is allowed to flow into the enclosed area and any air or gases are allowed to exit through the other entry/exit holes 200. Entry/exit holes 200 may be sealed leaving entry/exit hole 200' unsealed after the entire enclosed area is filled with liquid crystal material. Once the enclosed area is filled with liquid crystal material, entry/exit hole 200' may be sealed by fusing seal intake 180' and reincorporating it into fusible material 150, thereby excluding entry/exit hole 200' from the enclosed area.

In an alternate embodiment, entry/exit hole 200' may be the only hole in transparent plate 130. Again, LCD device 110''' may be first introduced into a low pressure atmosphere and then filled with liquid crystal material kept at a higher pressure through entry/exit hole 200'. The vacuuming action fills the enclosed area with liquid crystal material using entry/exit hole 200' as the only aperture. Entry/exit hole 200' may then be sealed off from the enclosed area by fusing and reincorporating seal intake 180' into fusible material 150.

Figure 8A:
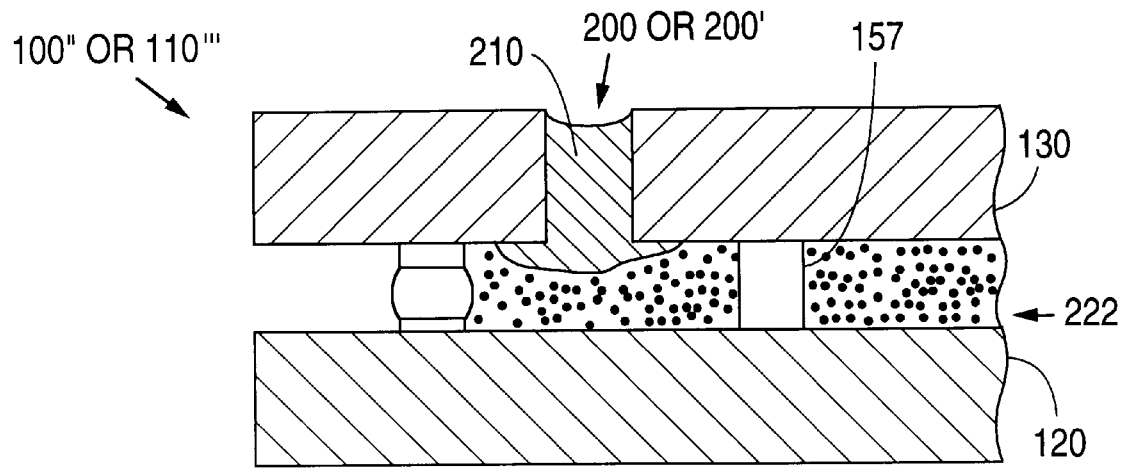
FIG. 8A is a cross-sectional view of an entry/exit hole being sealed in accordance with an embodiment of the present inventions.
Figure 8B:
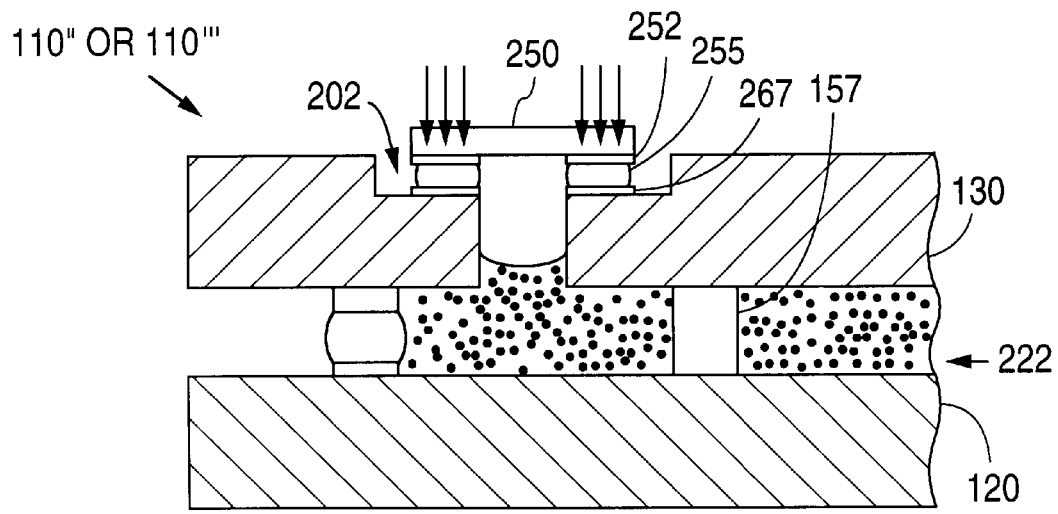
FIG. 8B is a cross-sectional view of an entry/exit hole being sealed in accordance with another embodiment of the present inventions.

FIGS. 8A and 8B are now referred to in a discussion concerning methods of sealing entry/exit holes 200 and/or 200'. The following discussion focuses on methods of sealing entry/exit holes 200, but the methods are readily applicable to entry/exit holes 200'. The discussion should be read to encompass all types of entry/exit holes discussed.

After the volume enclosed by transparent plate 130, die 120 and fusible material 150 is filled with a liquid crystal material 220 entry/exit hole 200 is filled with a sealant 210. Physically, it is desired to form a hermetic seal that does not protrude above the plane of transparent plate 130. To perform this function, a potting compound or any other suitable material may be used as sealant 210.

Sealant 210 is deposited within hole 200 such that it conforms to the vacant area left by liquid crystal material 220 and the interior of entry/exit hole 200. In the illustrated embodiment a curable liquid crystal material may be preferred. The curable liquid crystal material is typically cured before sealing hole 200. Curing of the curable liquid crystal material allows sealant 210 to conform to the vacant regions within the hole.

The sealant may then be cured by ultraviolet or localized infrared heating, and/or any other suitable method used for curing a sealant. Sealant 210, by way of example, may be comprised of acrylic/epoxy based materials, which may be cured through ultraviolet heating, or other types of curable material may be utilized in accordance with the present inventions. Again, the curing of sealant 210 is local and the dies and the transparent plate are not significantly heated.

In another embodiment of the present inventions, a lid may be utilized to seal entry/exit hole 200. FIG. 8B is a diagrammatic cross-sectional view of an LCD device utilizing a lid 250. Initially, an etched region 202 is formed over the opening of entry/exit hole 200 that has a diameter larger than entry/exit hole 200. Etch region 202 may be formed by utilizing the same methods for forming entry/exit hole 200.

The area immediately surrounding the aperture of entry/exit hole 200 is deposited with a metallization layer 267. Metallization layer 267 is formed within etched region 202 by any suitable method, for example, sputtering, deposition, or any other suitable method. Metallization layer 267 may also be comprised from any suitable material that may be formed on transparent plate 130 and that is readily solderable.

Fusible material 255 is then formed over the metallization layer 267. Fusible material 255 may be comprised of any suitable solder like material. In one embodiment, a low temperature solderable material may be utilized in order to heat the fusible material at low temperatures. Lid 250 is placed within etched region 202 over metallization layer 267 and fusible material 255. But, initially, a metallization layer 252 is formed on lid 250. Metallization layer 252 may be formed on lid 250 in the manner similar to that of metallization layer 267. Metallization layer 252 is similarly shaped to match the shape of metallization layer 267 on transparent plate 130.

Lid 250, with metallization layer 252 face down, is placed over fusible material 255 such that metallization layer 252 and metallization layer 267 are aligned. Lid 250 may be formed from a transparent plate similar to the material used to form transparent plate 130. Lid 250 may be fused to transparent plate 130 through localized heating, as described in reference to FIGS. 4A–4E.

Therefore, there exists several different ways of forming a seal within or over entry/exit holes 200 or 200'. Further, alternative ways of sealing holes in a transparent plate utilized in LCD devices may also be applied in accordance with the present inventions. Additionally, alternate methods for filling the enclosed areas of LCD devices with liquid crystal material may also be utilized in accordance with the present inventions.

Figure 9A:
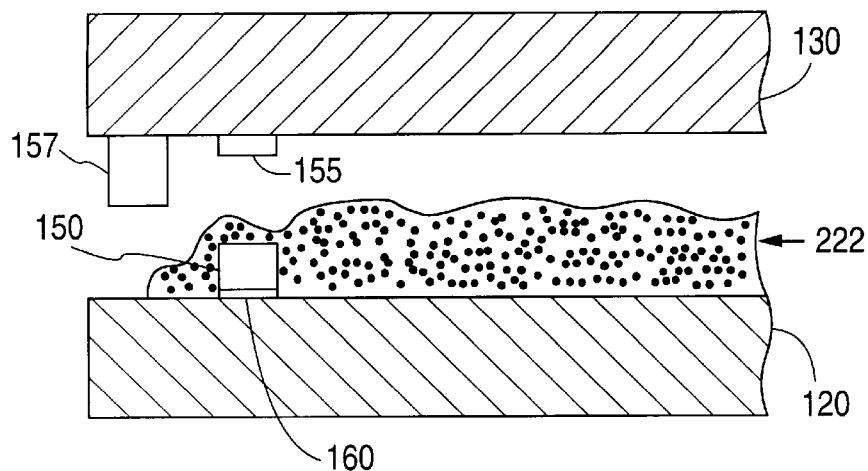
FIG. 9A is a cross-sectional view of filling an LCD device accordance with an embodiment of the present inventions.
Figure 9B:
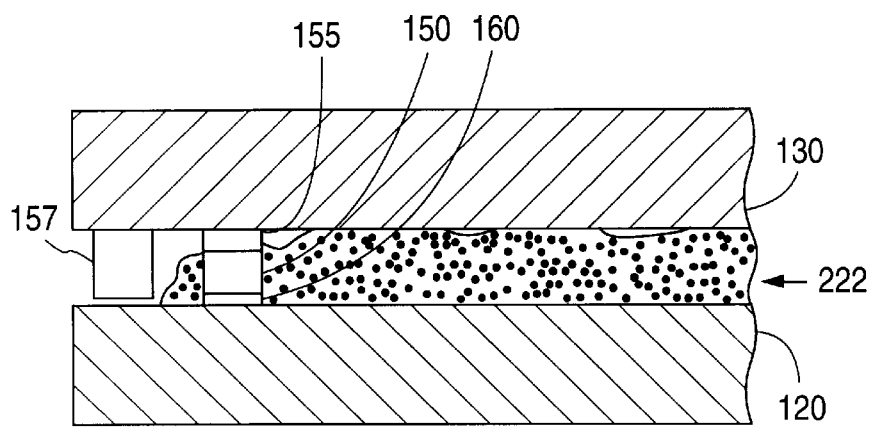
FIG. 9B is a cross-sectional view of filling a LCD device of FIG. 9A at a further stage in accordance with an embodiment of the present inventions.
Figure 9C:
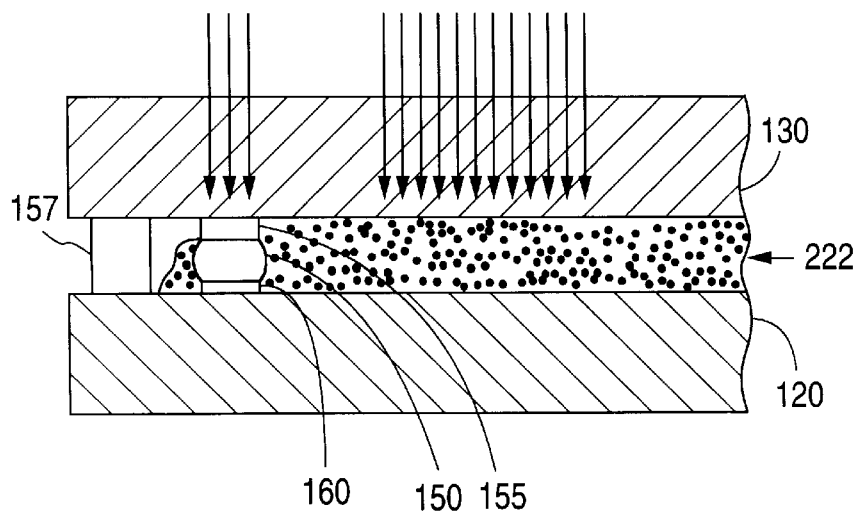
FIG. 9C is a cross-sectional view of filling a LCD device of FIG. 9B at a further stage in accordance with an embodiment of the present inventions.

FIGS. 9A–9C depict one such alternate method of filling an enclosed area of an LCD device with a liquid crystal material. FIGS. 9A–9C are cross-sections of an LCD device in accordance with the present inventions, similar to the cross sections depicted in FIGS. 4A, 4D, and 4E. However, prior to fusing transparent plate 130 to die 120 the area surrounded by fusible material 150 is filled with liquid crystal material 222. Liquid crystal material 222, in one embodiment, is a curable liquid crystal material.

In FIG. 9B transparent plate 130 is placed over die 120 such that top seal 155 is aligned over fusible material 150. Liquid Crystal material 222 is then trapped within the space enclosed by transparent plate 130, die 120 and fusible material 150.

In FIG. 9C fusible material 150 is locally heated, as previously described. The fusing of fusible material 150 causes transparent plate 130 to be drawn closer to die 120 until precision conductive spacers 157 comes in contact with both transparent plate 130 and die 120. After fusible material 150 has been fused to attach transparent plate 130 to die 120, liquid crystal material 222 may be cured. Liquid crystal material 222 may be cured by several means, for example, ultra violet, infrared, or other suitable methods of curing liquid crystal material without significantly heating the entire LCD device.

Wafer Scale Processing

Thus, there are several different methods for filling the enclosed area of an LCD device with liquid crystal material. The methods described in reference to FIGS. 7A through 7B, 8A through 8B, and 9A through 9C have the added advantage of being applicable to wafer scale processing. That is, the methods and processes discussed in reference to those figures, and potentially all of the discussed methods and processes, may be applied to an entire wafer of LCD dies. Wafer scale processing avoids the problems associated with performing steps on a multitude of single LCD dies. Significant economies of scales are achieve by utilizing wafer scale processing. Accordingly, the following discussion will focus on the applicability of the present inventions to wafer scale processing.

Figure 10:
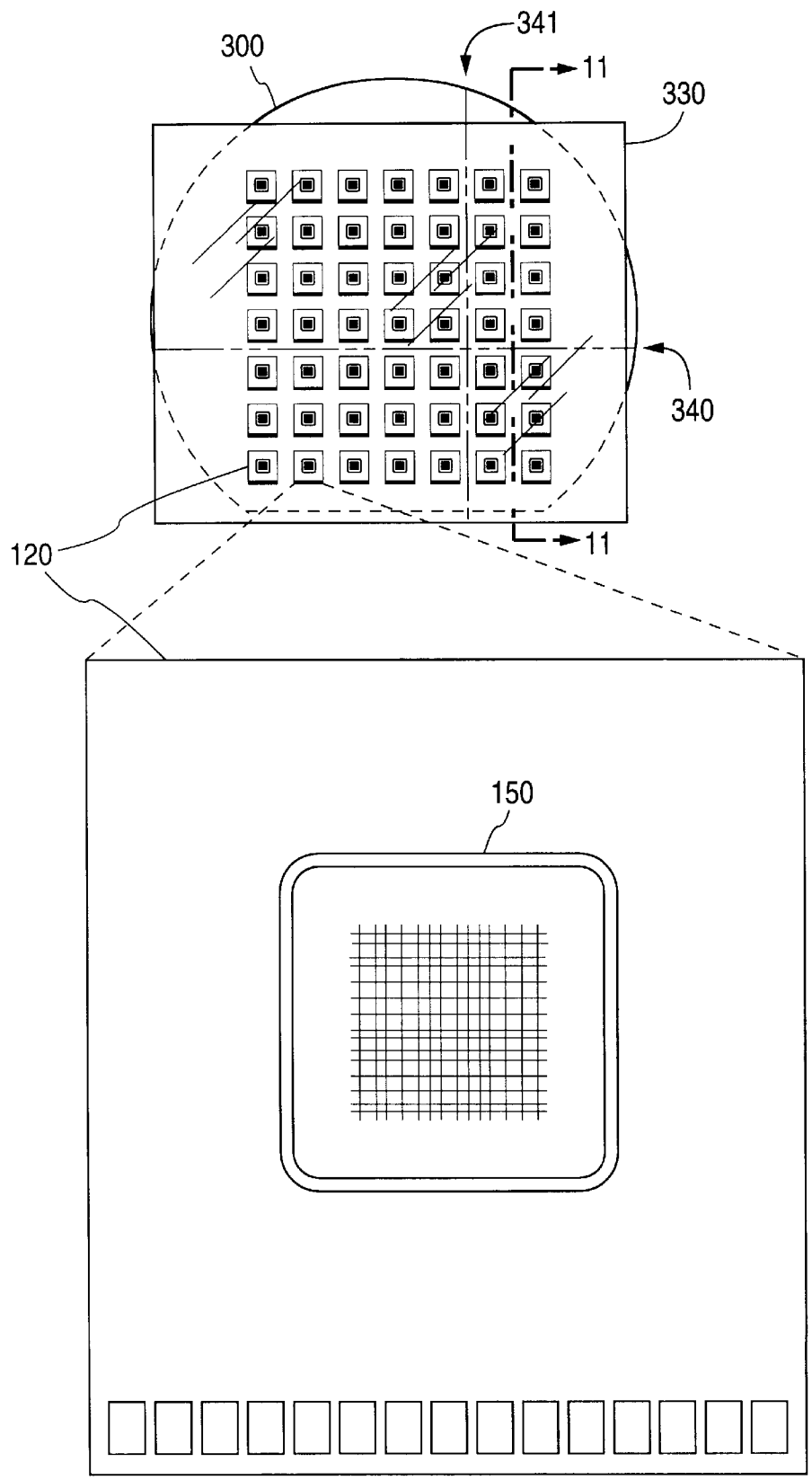
FIG. 10 is a top plan view of a plurality of LCD devices on a wafer in accordance with an embodiment of the present inventions.

Referring now to FIG. 10, methods for wafer scale processing are discussed. FIG. 10 is a top plan view of a wafer 300 containing an array of LCD device dies 120. Prior art LCD device dies are typically not processed in large numbers on a single wafer. Typically, in prior art methods of forming LCD devices, LCD dies are singulated before further processing. That is, LCD device dies are individually cut from a wafer before being mounted on a substrate or having a transparent plate mounted over it. Subsequent processing steps are then conducted individually on each die. Wafer scale processing allows processing steps to be performed on a large number of dies on a single wafer in one step, as opposed to individual steps.

Initially a large transparent plate 330 may be placed over wafer 300 containing a number of dies 120. Prior to placement of large transparent plate 330 precision conductive spacers 157 and fusible seals 150 may be formed on each LCD die 120, as discussed earlier. The method of filling an enclosed area of an LCD device, discussed in reference to FIGS. 7A–7B, 8A–8B, and 9A–9C, may be utilized to fill the enclosed areas formed by the meeting of large transparent plate 330 and wafer 300 for each LCD die 120. Many of the processing steps of forming an LCD device, in accordance to one embodiment of the present inventions, are completed on a wafer scale. Advantageously, separate processing steps for each individual die are eliminated.

Once large transparent plate 330 is attached to wafer 300 and filling with liquid crystal material has been accomplished, the individual LCD devices may then be singulated. Cuts 340 and 341, for example, may be made between individual LCD dies 120. It may be appreciated that cuts similar to cuts 340 and 341 are additionally made to individually singulate all LCD dies 120, thereby forming a number of individual LCD devices 111.

Figure 11:
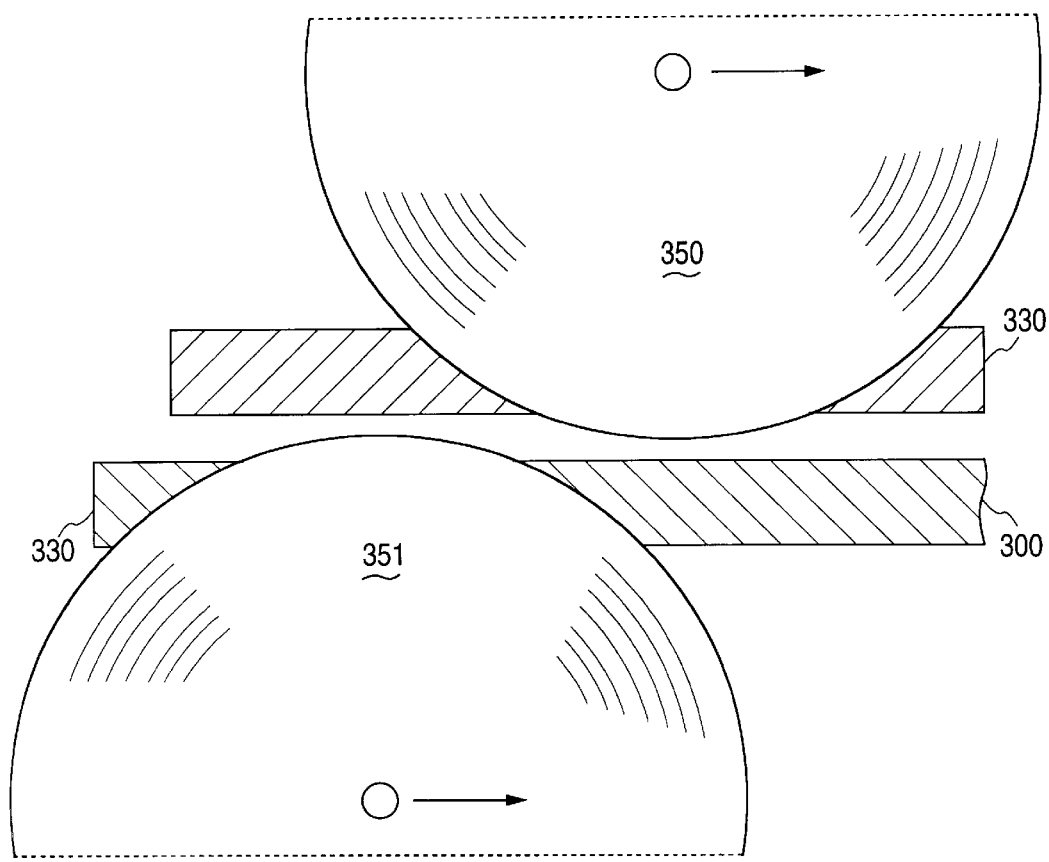
FIG. 11 is a partial cross-sectional view of the wafer of FIG. 10 taken along the lines 11—11 while being cut in accordance with an embodiment of the present inventions.

In another embodiment of the present inventions cuts made on the wafer, for example, 340 and 341, may be made using a dual blade mechanism, referring now to FIG. 11. FIG. 11 is a partial cross-section of wafer 300 of FIG. 10 taken along the lines 11—11. FIG. 11 also illustrates dual cutting blades 350 and 351, cutting along the line 11—11 through wafer 300 and large transparent plate 330.

In one embodiment of the present inventions, a first blade 350 precedes a second blade 351. In the illustrated embodiment, first blade 350 passes through large transparent plate 330 without touching wafer 300. First blade 350 is followed by second blade 351. Second blade 351 cuts through wafer 300 without touching large transparent plate 330. By passing first and second blades 350 and 351 through the length of wafer 300 and large transparent plate 330, a cut may be made completely through both materials. Further cuts may be made to completely singulate all the LCD device dies on wafer 300. The illustrated embodiment depicts first blade 350 preceding the second blade 351, however either blade may precede the other in accordance with alternate embodiments of the present inventions. Additionally, a single blade may be used to initially cut one of either large transparent plate 330 or wafer 300 and then cuts may be applied to the other of the two materials.

Once all of the cuts have been made on a wafer scale, the end result is a number of LCD devices 111, as depicted in FIG. 12A. FIG. 12A is a diagrammatic perspective view of a singulated LCD device in accordance with an embodiment of the present inventions. LCD device 111 is similar to the LCD devices discussed in reference to the previous figures. However, LCD device 111 includes a transparent plate 130 that extends over bond pads 125. In order to remove a portion of transparent plate 130 that extends over bond pads 125, another cut is made to transparent plate 130.

A blade 352 is applied to transparent plate 130 in order to form a score 132 on transparent plate 130 between the area immediately above bond pads 125 and the area over fusible material 150. FIG. 12B is a view of the die of FIG. 12A with a completed score 132. Score 132 segregates the main portion of transparent plate 130 with an extended portion 130'. It is desired to remove the extended portion 130' in order to expose bond pads 125.

Any number of methods may be used to break off extended portion 130' once score 132 has been made. By way of example, a punch press, a bonding needle, or any other suitable means for applying a slight force upon extended portion 130' may be utilized to break off extended portion 130'. Applying a slight pressure on extended portion 130' will cause extended portion 130' to break off from transparent plate 130 at score 132, exposing bond pads 125 out from under transparent plate 130. LCD device 111 may then be attached to a substrate to form a completed LCD device. Further processing steps such as glob coating and wire bonding may be performed on the completed LCD device.

Processing Methods

Figure 15:
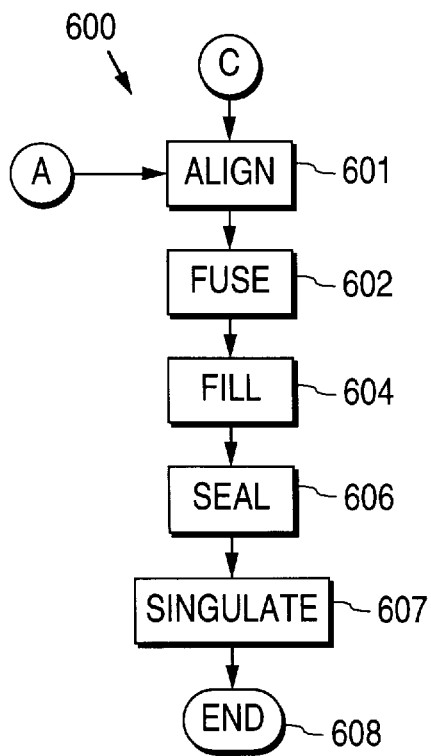
FIG. 15 is a flow chart of a process of assembling a transparent plate and one or more dies on a wafer scale level in accordance with an embodiment of the present inventions.
Figure 13:
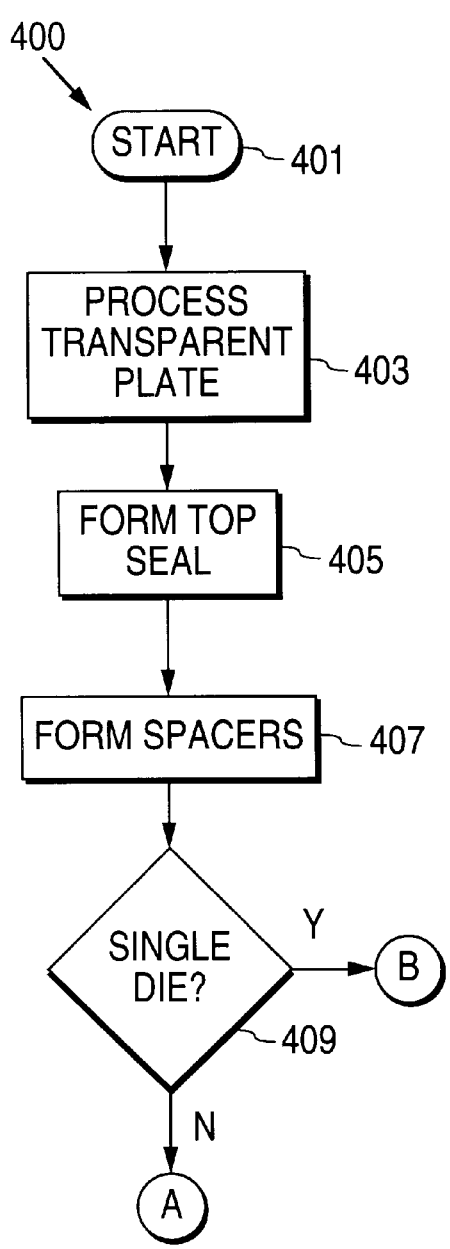
FIG. 13 is a flow chart of a process of preparing a transparent plate in accordance with an embodiment of the present inventions.
Figure 14:
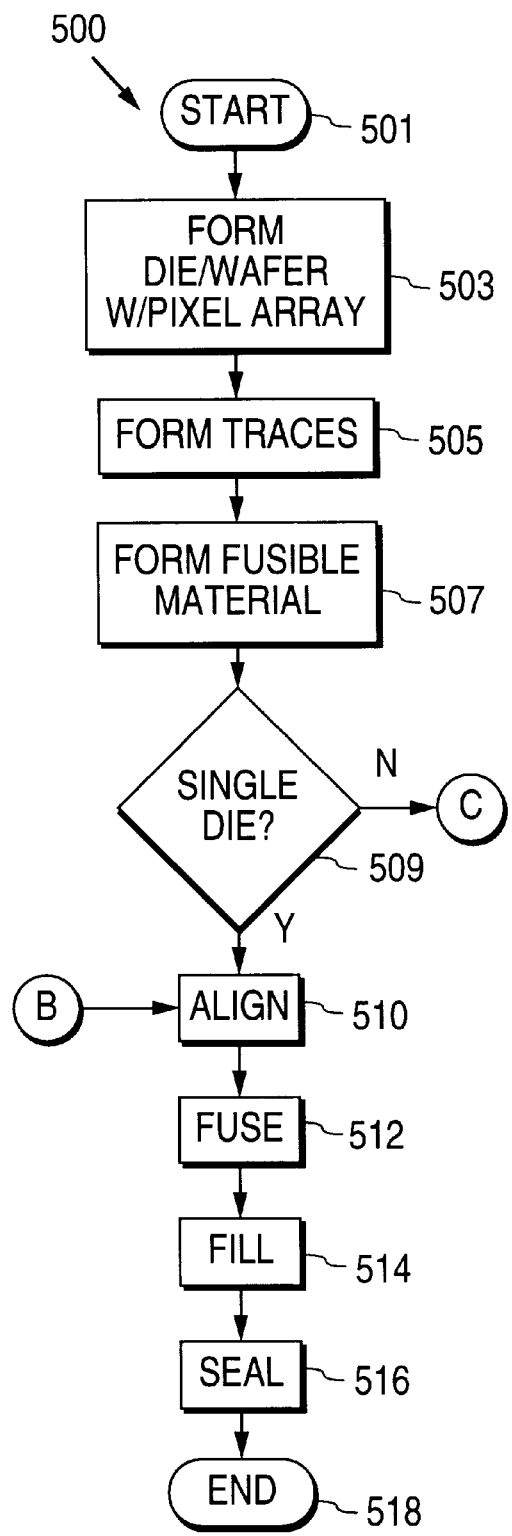
FIG. 14 is a flow chart of a process of preparing an LCD die in accordance with the present inventions.

FIGS. 13–15 are flow charts depicting the process flow for producing an LCD device in accordance to alternate embodiments of the present invention. As described, herein and above, the process steps may be applied on a single die level or on a wafer scale level. For purposes of brevity the flow charts depicted in FIGS. 13–15 relate to both single die and wafer scale processing. However, alternative embodiments of the present inventive methods may be performed on either scale. Referring now to FIG. 13, a flow chart 400 of the process of preparing a transparent plate is shown.

Flow chart 400 begins at block 401 and proceeds to block 403. In block 403 a transparent plate is formed. The transparent plate may be suitable for a single die or for an entire wafer of dies. The transparent plate may be any suitable type of material. In alternative embodiments, glass and plastic work well as the transparent material used in transparent plate 130. At this point, any types of layers may be applied to the transparent plate. For example, an indium-tin oxide layer for providing a conductive layer opposite the pixel array of a die may be applied to the transparent plate. Other types of conductive or protective layers may also be applied to the transparent plate. After application of any layers, in one embodiment, entry/exit holes may be drilled through the transparent plate and any applied layers. In other embodiments, as discussed, entry/exit holes are not required.

Flow chart 400 proceeds to block 405 where the top seal is applied to the transparent plate. The top seal is affixed to a side of the transparent plate that is to face the pixel array of the die/wafer. The top seal may be comprised of a single or multiple layers, as described above. The methods of applying the top seal encompass, without limitation, sputtering, deposition, electrolytic deposition, electroless deposition or any other suitable methods of applying metallic layers to a transparent plate and on underlying layers of the top seal.

In a particular embodiment, spacers are applied to the transparent plate in block 407. The spacers, in one embodiment, may be precision conductive spacers, as detailed in the previously referenced co-pending application. Again, spacers may be formed on the die/wafer rather than the transparent plate, in which case the step may be performed in the flow chart referred to by FIG. 14.

In another embodiment spacers may not be needed. In such an embodiment the transparent plate may be held in place while the fusible material is being fused. The transparent plate is held until the fusible material has cooled and solidified. Techniques for maintaining the transparent plate at a fixed height above the die, as known in the art, may be utilized in accordance with the particular embodiment.

Proceeding to block 409, if the transparent plate is a single transparent plate to be applied to a single LCD die then flow proceeds to block B and FIG. 14. If the transparent plate is a larger transparent plate to be applied to a wafer, flow proceeds to block A and FIG. 15.

FIG. 14 is a flow chart 500 of the process of preparing an LCD die and assembling the LCD die with the transparent plate in accordance with the present inventions. Flow chart 500 begins in block 501 and proceeds to block 503. In block 503 an LCD die is formed with a pixel array and any other suitable circuitry.

Moving to block 505 traces are applied to the die around the pixel array. The location of the majority of the traces correspond to the location of the top seal on the corresponding transparent plate. In another embodiment, some of the traces may be utilized in forming channels and seal intake traces for forming a seal intake and aperture. The traces may be formed on the die through any suitable method including, without limitation, sputtering, deposition, electrolytic deposition, electroless deposition or any other suitable method.

After the traces have been formed on the die, fusible material may be formed over the traces in block 507. Fusible material is applied to some or all of the traces, as discussed in reference to the different embodiments discussed. The fusible material may be applied to the traces by plating, sputtering, jet soldering, vacuum soldering, tack welding or any other suitable method. In an alternate embodiment, a ball bonding apparatus may be utilized to place a number of ball bonds composed of fusible material along the traces. Uniformity of size is not a strict requirement because the fusible material will be reflowed to create the final seal.

Flow proceeds to block 509 and further proceeds to block C and FIG. 15 if the die is part of a wafer containing other similarly processed dies. If the die is a single die flow proceeds to block 510. In block 510 the single die and the single transparent plate, provided from block B of FIG. 13, are aligned with each other such that the fusible material is aligned with the top seal. In block 512 the die and the transparent plate are fused together. The fusible material is fused to the top seal of the transparent plate. In alternate embodiments where a seal intake is utilized, those portions of the fusible material are not fused. The process of fusing, as discussed, may be performed by any suitable method of localized fusing including, without limitation, infra-red lasers, ultra-violet lasers, optical lasers, pulsed thermode heating.

After fusing, the LCD device formed by the joining of the die and the transparent plate is filled with liquid crystal materials in block 514. Any type of suitable liquid crystal materials may be utilized. In alternate embodiments, curable liquid crystal materials, polymer dispersed liquid crystal materials, twisted nematic crystals, ferro-electrical materials or combinations thereof may be utilized in accordance with the present inventions.

If necessary, the liquid crystal materials are also cured in block 514. Curing at this stage of processing does not cause the problems of bowing or warping because the fusible seal has already been formed and will not permanently deform as in prior art methods. Thus, the die or the transparent plate will have a tendency not to deform during any curing process. In an alternate embodiment, the liquid crystal materials may be cured through localized curing, similar to the methods of applying heat to the fusible material. Localized heating further avoids the problems of warping. In another embodiment, the liquid crystal materials may be cured after alignment of the die and the transparent plate, but before fusing the fusible material to the top seal.

Proceeding to block 516, the LCD device is completely sealed. In one embodiment, entry/exit holes are sealed, as described above. In other embodiments, a seal intake and aperture are sealed by fusing and wicking those portions of the fusible material. The process then ends in block 518.

FIG. 15 is a flow chart 600 of assembling a transparent plate and one or more dies on a wafer scale level. Flow chart begins at block 601 where the transparent plate provided by block A of FIG. 13 and the wafer provided by block C of FIG. 14 are aligned. The top seals and the fusible materials of the discrete devices are aligned together on a wafer level.

After alignment, the transparent plate and the wafer are fused together in block 602 through any of the methods discussed in reference to block 512 of FIG. 14. If wafer scale processing is utilized seal intakes and apertures would be inconvenient because the seal intakes would not be accessible during the filling and sealing discussed below. It may be preferred then to utilize entry/exit holes rather than seal intakes to provide an avenue for filling the LCD devices. Also, entry/exit holes used in conjunction with seal intakes may also be appropriate for wafer scale processing.

The individual LCD devices formed by the fusing of the transparent plate to the wafer are then filled with liquid crystal material in block 604. Any of the suitable methods of filling the LCD devices discussed may be utilized in accordance with the present inventions. After the LCD devices have been filled any entry/exit holes or other apertures are sealed.

In an alternate embodiment, filling the LCD devices proceed before aligning, fusing and sealing the transparent plate to the wafer. As discussed in reference to FIGS. 9A–9C the area encircled by the fusible material may be filled with liquid crystal material before placing the transparent plate on the wafer. This method may be utilized on a wafer scale level to fill the LCD devices. The particular embodiment has the added advantage of eliminating the sealing process of block 606 because the fusing of the fusible material forms a complete seal.

The individual LCD devices are then singulated in block 607. The methods of singulation discussed in reference to FIGS. 10, 11 and 12A–12B may be utilized to singulate the LCD devices. Further, any other suitable methods of singulation may be used including, without limitation, laser cutting, precision drilling chemical etching. The flow chart ends in block 608 after the LCD devices have been singulated.

The present inventions may be manufactured in any suitable combination of the methods just described. The operations discussed in reference to FIGS. 13 and 14 are generally applicable to single die fabrication and wafer scale fabrication, as discussed. The processing operations may also be performed in any suitable order. The same holds true for the fabrication steps discussed in reference to FIG. 15 regarding wafer scale fabrication.

Wafer scale fabrication is just one of the many advantages of the present inventions. Wafer scale fabrication drastically reduces the number of processing steps involved in fabricating a large number of LCD devices. Costs and time are also significantly decreased through wafer scale fabrication. The use of a fusible seal that can be formed on multiple dies of a single wafer provides the ability to conduct wafer scale processing.

More importantly, a fusible seal prevents the negative side effects of curing an entire LCD device, which is typically necessary in prior art methods of sealing an LCD device. A fusible seal may be formed by heating only the portions of the LCD device that comprise the fusible seal. Localized heating avoids bowing and warping that often times render prior art LCD devices inoperative.

A fusible seal also allows selective fusing operations. Since the fusible seal is heated in a localized manner more detailed operations may be performed on the fusible seal. As discussed, different methods of filling and sealing any entry/exit holes in the LCD devices may be utilized in accordance with the present inventions. The unique methods of filling and sealing are also readily applicable to wafer scale fabrication.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A fusible seal device for use in a liquid crystal display device including a die having a pixel array, and a transparent plate, said fusible seal device comprising:
    a fusible seal composed of a fusible material configured to be positioned between the transparent plate and the die surrounding the pixel array; and
    a top seal including a first layer composed of first material suitable for bonding to the transparent plate, a second layer composed of second material suitable for bonding to the first material, and a third layer composed of third material suitable for bonding to the second material and the fusible seal material;
    wherein when the transparent plate is placed over the die, and when the fusible seal material and the top seal are locally heated, such that the entire liquid crystal display device need not be cured, the top seal and the fusible material form a substantially continuous seal around the pixel array.

2. The fusible seal device of claim 1 wherein
the fusible seal comprises a trace disposed on the die and the fusible material disposed on the third layer, wherein when the transparent plate is placed over the die the trace and the fusible material form a substantially continuous seal, and when the trace and the fusible material are locally heated the trace and the fusible material fuse to form the fusible seal.

3. The fusible seal device of claim 1 wherein
the first material the second material and the third material of the top seal are comprised of a material chosen from the group consisting of gold, tin, nickel, indium, palladium, copper, titanium, titanium-tungsten, nickel-vanadium and combinations thereof.

4. The fusible seal device of claim 1 wherein
the first layer is comprised of a material chosen from the group consisting of gold, platinum, silver, silver-tin alloy, palladium, lead and combinations thereof.

5. The fusible seal device of claim 1 wherein
the second layer is comprised of a material chosen from the group consisting of nickel, tin, copper, palladium and combinations thereof.

6. The fusible seal device of claim 1 wherein
the third layer is comprised of a material chosen from the group consisting of tin, lead, indium and combinations thereof.

7. The fusible seal device of claim 1 wherein
the fusible material is comprised of a solderable material.

8. The fusible seal device of claim 1 wherein
the fusible material is comprised of a material chosen from the group consisting of tin, lead, indium, palladium and combinations thereof.

9. The fusible seal device of claim 1 wherein
the fusible material is in a substantially continuous closed end loop on the die surrounding the pixel array.

10. A liquid crystal display (LCD) device comprising:
    a die having a pixel array;
    a transparent plate spaced a predetermined distance from the die, and above the pixel array; and
    a fusible seal composed of a fusible material configured to be positioned between the die and the transparent plate enclosing the pixel array within an enclosed volume, and a top seal including a first layer composed of first material suitable for bonding to the transparent plate, a second layer composed of second material suitable for bonding to the first material, and a third layer composed of third material suitable for bonding to the second material and the fusible seal material;

wherein when the transparent plate is placed over the die, and when the fusible seal material and the top seal are locally heated, such that the LCD die and the transparent plate are not substantially heated, the top seal and the fusible material form a substantially continuous seal around the pixel array.

11. The LCD device of claim 10, wherein the fusible seal comprises a trace disposed on the die and the fusible material disposed on the third layer, wherein when the transparent plate is placed over the die the trace and the fusible material form a substantially continuous seal and when the trace and the fusible material are locally heated the top seal and the fusible material fuse to form the fusible seal.

12. The LCD device of claim 10, wherein the fusible material is comprised of a solderable material.

13. The LCD device of claim 10, wherein the fusible material is comprised of a material chosen from the group consisting of tin, lead, indium, palladium and combinations thereof.

14. The LCD device of claim 10, wherein the fusible material is in a substantially continuous closed end loop on the die surrounding the pixel array.

15. The LCD device of claim 10, wherein the first material, the second material and the third material of the top seal are comprised of a material chosen from the group consisting of gold, tin, nickel, indium, palladium, copper, titanium, titanium-tungsten, nickel-vanadium and combinations thereof.

16. The LCD device of claim 10, wherein the first layer is comprised of a material chosen from the group consisting of gold, platinum, silver, silver-tin and combinations thereof.

17. The LCD device of claim 10, wherein the second layer is comprised of a material chosen from the group consisting of nickel, tin, copper, palladium and combinations thereof.

18. The LCD device of claim 10, wherein the third layer is comprised of a material chosen from the group consisting of tin, lead, indium and combinations thereof.

19. The LCD device of claim 10, wherein the die further comprises a trace substantially surrounding the pixel array, such that the fusible material is arranged on the trace and the top seal is arranged in a substantially mirror image shape of the trace, the top seal and the fusible material forming a substantially continuous seal and when the top seal and the fusible material are locally heated the top seal and fusible material fuse to form the fusible seal.

20. The LCD device of claim 10, further comprising a spacer, wherein the spacer spaces the transparent plate from the die at the predetermined distance.

21. The LCD device of claim 20, wherein the spacer is a precision conductive spacer.

22. The LCD device of claim 10, wherein the transparent plate further comprises an entry/exit aperture configured to allow the passage of a liquid crystal material into and out of the enclosed volume formed by the transparent plate, the die and the fusible seal.

23. The LCD device of claim 22, wherein the transparent plate further comprises a sealant disposed within the entry/exit aperture and sealing the enclosed volume formed by the transparent plate, the die and the fusible seal.

24. The LCD device of claim 10, wherein the transparent plate further comprises a lid disposed over the entry/exit aperture, and a fusible lid seal disposed between the lid and the transparent plate forming a seal between the lid and the transparent plate and sealing the entry/exit aperture, such that the fusible lid seal is fused by local heating.

25. The LCD device of claim 10 further comprising a liquid crystal material disposed within the enclosed volume formed by the transparent plate, the die and the fusible seal.

26. The LCD device of claim 25, wherein the liquid crystal material is a polymer dispersed liquid crystal material.

27. The LCD device of claim 25, wherein the liquid crystal material is a curable liquid crystal material.

28. The LCD device of claim 10, wherein the transparent plate further comprises a conductive coating, the conductive coating disposed on a side of the transparent plate facing the die and the pixel array.

29. The LCD device of claim 28, wherein the conductive coating is comprised of indium-tin oxide.

30. A liquid crystal display (LCD) device comprising:

a transparent plate having a perimeter;

a die having a pixel array and a perimeter greater than the perimeter of the transparent plate, wherein the die is spaced a predetermined distance below the transparent plate such that the transparent plate covers the pixel array and a portion of the die; and a fusible seal device located on the die including a top seal and a fusible seam material having a first portion and a second portion, the first portion substantially sealing the transparent plate to the die and substantially enclosing the pixel array between the transparent plate and the die, and the second portion protruding out from the perimeter of the transparent plate, but within the perimeter of the die, and forming an aperture providing access to a volume between the transparent plate, the die and the first portion of the fusible seal, wherein the aperture is configured to allow the passage of a liquid crystal material into and out of the volume, said top seal including a first layer composed of first material suitable for bonding to the transparent plate, a second layer composed of second material suitable for bonding to the first material, and a third layer composed of third material suitable for bonding to the second material and the fusible seal material.

31. A method for fabricating a liquid crystal display (LCD) device comprising:

positioning a transparent plate above a die, the die having a pixel array;

disposing a fusible material on the die substantially encircling the pixel array, wherein the fusible material is disposed between the transparent plate and the die;

forming a top seal to the transparent plate including a first layer composed of first material suitable for bonding to the transparent plate, a second layer composed of second material suitable for bonding to the first material, and a third layer composed of third material suitable for bonding to the second material and the fusible seal material and;

locally applying heat to the fusible material such that the fusible material fuses to the third layer of the top seal, forming a fusible seal between the transparent plate and the die, and enclosing the pixel array, and the application of heat to the fusible material does not significantly heat the transparent plate or the die, whereby the transparent plate and the die are not significantly deformed.

32. The method of claim 31, wherein the application of heat to the fusible material is performed by a laser.

33. The method of claim 31 wherein
the top seal is a substantial mirror image of the fusible material disposed on the die, such that when the transparent plate is disposed above the die the top seal is substantially continuously in contact with the fusible material, and when heat is applied to the fusible material the top seal and the fusible material fuse to form the fusible seal.

34. The method of claim 31 further comprising:
forming a trace on the die, the trace substantially encircling the pixel; and
forming the fusible material on the trace prior to disposing the transparent plate above the die.

35. The method of claim 31 further comprising:
forming an entry/exit aperture in the transparent plate prior to disposing the transparent plate above the die, the entry/exit aperture being configured to allow the passage of a liquid crystal material into and out of an enclosed volume formed by the transparent plate, the die and the fusible seal.

36. The method of claim 35 further comprising:
filling the enclosed volume formed by the transparent plate, the die and the fusible seal with a liquid crystal material; and
sealing the entry/exit aperture.

37. The method of claim 36, wherein the entry/exit aperture is sealed by disposing a sealant into the entry/exit aperture.

38. The method of claim 36, wherein the entry/exit aperture is sealed by:
disposing a fusible lid seal material on the transparent plate, the fusible lid seal encircling the entry/exit aperture;
disposing a lid on the fusible lid seal material;
locally applying heat to the fusible lid seal material, forming a fusible lid seal between the transparent plate and the lid, and sealing the entry/exit aperture and the enclosed volume formed by the transparent plate, the die and the fusible seal.

39. The method of claim 36 further comprising:
curing the liquid crystal material within the enclosed volume.

40. The method of claim 31 further comprising:
forming a spacer on the die prior to disposing the transparent plate above the die, such that the spacer maintains a predetermined distance between the transparent plate and the die when the transparent plate is fused to the die during the local application of heat to the fusible material.

41. The method of claim 31 further comprising:
forming a spacer on the transparent plate prior to disposing the transparent plate above the die, such that the spacer maintains a predetermined distance between the transparent plate and the die when the transparent plate is fused to the die during the local application of heat to the fusible material.

42. A method for fabricating a liquid crystal display (LCD) device comprising:
fusing a transparent plate having a perimeter to a die having a perimeter with a fusible seal, the die having a pixel array, wherein the pixel array is encompassed within an enclosed volume between the die, the transparent plate and the fusible seal, wherein the fusible seal is locally heated in the process of fusing without significantly heating the transparent plate and the die;

forming a top seal to the transparent plate including a first layer composed of first material suitable for bonding to the transparent plate, a second layer composed of second material suitable for bonding to the first material, and a third layer composed of a third material suitable for bonding to the second material and the fusible seal;
filling the enclosed volume with a liquid crystal material; and
sealing the enclosed volume by refusing a portion of the fusible seal, wherein the portion of the fusible seal is locally heated.

43. The method of claim 42, wherein in the process of sealing the enclosed volume the portion of the fusible seal is refused such that the fusible seal is disposed completely within the diameters of the transparent plate and the die and the fusible seal encircling the pixel array.

44. The method of claim 42 further comprising:
forming a first trace and a seal intake trace on the die, wherein the first trace is disposed within the perimeter of the transparent plate when the transparent plate is fused to the die, and the seal intake trace is disposed outside the perimeter of the transparent plate when the transparent plate is fused to the die;
forming a fusible material on the first and seal intake traces, wherein in the process of fusing the transparent plate to the die a first portion of the fusible material disposed on the first trace is locally heated fusing the transparent plate to the die, and in the process of sealing a second portion of the fusible material disposed on the seal intake trace is locally heated such that the second portion of the fusible material is wicked to the first trace, whereby the enclosed volume is completely sealed.

45. The method of claim 42, wherein the transparent plate includes an entry/exit aperture, such that in the process of fusing the transparent plate to the die the entry/exit aperture provides access into and out of the enclosed volume, and in the process of filling the enclosed volume the liquid crystal material is passed into the enclosed volume through the entry/exit aperture, wherein in the process of sealing the enclosed volume the portion of the fusible seal is refused such that the portion of the fusible seal is moved such that the entry/exit aperture no longer provides access into and out of the enclosed volume.

46. A method for fabricating a liquid crystal display (LCD) device comprising:
forming a fusible material on a die, the die having a pixel array, the fusible material encircling the pixel array and forming a reservoir;
forming a top seal on a transparent plate including a first layer composed of first material suitable for bonding to the transparent plate, a second layer composed of second material suitable for bonding to the first material, and a third layer composed of third material suitable for bonding to the second material and the fusible material;
filling the reservoir with a liquid crystal material;
disposing the transparent plate on the fusible material; and
locally applying heat to the fusible material, wherein the transparent plate and the die are fused together and the reservoir and the liquid crystal material are sealed.

47. A method for fabricating a plurality of liquid crystal display (LCD) devices comprising:
providing a plurality of LCD dies and a transparent plate on a wafer, each LCD die having a pixel array; and disposing a fusible material on each LCD die encircling a corresponding pixel array of each corresponding LCD die to form a respective reservoir; and forming a plurality of top seals on the transparent plate corresponding to each LCD die, each top seal including a first layer composed of first material suitable for bonding to the transparent plate, a second layer composed of second material suitable for bonding to the respective first material, and a third layer composed of third material suitable for bonding to the respective second material and the respective fusible material.

48. The method of claim 47 further comprising:

filling each reservoir formed by each of the plurality of fusible material with liquid crystal material;

disposing the transparent plate on the plurality of fusible material over the wafer and the plurality of dies; and locally applying heat to the plurality of fusible material, forming a plurality of fusible seals between the transparent plate and the wafer, wherein each fusible seal encompasses a pixel array.

49. The method of claim 48 further comprising:

singulating the plurality of LCD devices, each of the singulated plurality of LCD devices comprising a singulated portion of the transparent plate, a singulated die of the plurality of dies and a fusible seal of the plurality of fusible seals.

50. The method of claim 47, further comprising:

disposing a transparent plate on the plurality of fusible material over the wafer and the plurality of dies, the transparent plate having a plurality of entry/exit apertures, each of the entry/exit apertures providing access to the reservoir of a corresponding each of the plurality of dies on the wafer;

locally applying heat to the plurality of fusible material forming a plurality of fusible seals between the transparent plate and the wafer, wherein each fusible seal encompasses a pixel array;

filling the reservoirs formed by each of the plurality of fusible material with liquid crystal material through the plurality of entry/exit apertures; and sealing the plurality of entry/exit apertures.

51. The method of claim 50 further comprising:

singulating the plurality of LCD devices, each singulated plurality of LCD devices comprising a singulated portion of the transparent plate, a singulated die of the plurality of dies and a fusible seal of the plurality of fusible seals.

* * * * *